US012801667B2

(12) United States Patent
Cowan

(10) Patent No.: US 12,801,667 B2
(45) Date of Patent: Nov. 17, 2026

(54) AUTOMATED REPORT GENERATION

(71) Applicant: AutoScience Institute, Redwood City, CA (US)

(72) Inventor: Eliot Julien Cowan, Redwood City, CA (US)

(73) Assignee: AutoScience Institute, Redwood City, CA (US)

( * ) Notice: Subject to any disclaimer, the term of this patent is extended or adjusted under 35 U.S.C. 154(b) by 0 days.

(21) Appl. No.: 19/412,495

(22) Filed: Dec. 8, 2025

(65) Prior Publication Data

US 2026/0161709 A1 Jun. 11, 2026

Related U.S. Application Data

(60) Provisional application No. 63/729,820, filed on Dec. 9, 2024.

(51) Int. Cl.

*G06F 16/903* (2019.01)
*G06F 16/334* (2025.01)
*G06F 16/35* (2019.01)
*G06F 16/9032* (2019.01)
*G06F 16/93* (2019.01)

(52) U.S. Cl.

CPC ........ *G06F 16/9032* (2019.01); *G06F 16/334* (2019.01); *G06F 16/35* (2019.01); *G06F 16/93* (2019.01)

(58) Field of Classification Search

None

See application file for complete search history.

(56) References Cited

U.S. PATENT DOCUMENTS 8,706,742 B1 4/2014 Ravid
11,900,244 B1 2/2024 Genc
12,541,545 B1 * 2/2026 Thanvantri Vasudevan ................ G06F 16/338
2015/0278110 A1 10/2015 Gschwind
2017/0204405 A1 7/2017 Cope (Continued)

FOREIGN PATENT DOCUMENTS

CN 116029334 A * 4/2023
IN 202331000422 A * 1/2023

(Continued)

OTHER PUBLICATIONS

Chain of Ideas: Revolutionizing Research via Novel Idea Development with LLM agents, Li et al (Year: 2024).*

(Continued)

*Primary Examiner* — Augustine K. Obisesan

(74) *Attorney, Agent, or Firm* — Van Pelt, Yi & James LLP

(57) ABSTRACT

A large language model is utilized to generate one or more new ideas. The new ideas represent intermediate states of a process. An initial set of documents and one or more other documents related to the initial set of documents are obtained. The initial set of documents and the one or more other documents are provided to the large language model to generate the one or more new ideas. An artificial intelligence agent is used to execute the intermediate states of the new ideas. The large language model is utilized iteratively validate results of executing the intermediate states of the new ideas. A technical report is generated based on the validated results.

17 Claims, 12 Drawing Sheets

(56) References Cited

U.S. PATENT DOCUMENTS

| | | | | |
|---|---|---|---|---|
| 2018/0018582 | A1 | 1/2018 | Unsal | |
| 2022/0035878 | A1 | 2/2022 | Sarah | |
| 2022/0107984 | A1 | 4/2022 | Reed | |
| 2022/0121939 | A1 | 4/2022 | Evans | |
| 2023/0140791 | A1 | 5/2023 | Brambila | |
| 2023/0205779 | A1 | 6/2023 | Khambholja | |
| 2023/0376409 | A1 | 11/2023 | Ziegler | |
| 2023/0409957 | A1 | 12/2023 | Marinescu | |
| 2024/0291785 | A1 | 8/2024 | Fields | |
| 2024/0330583 | A1 | 10/2024 | Ryan | |
| 2025/0265286 | A1* | 8/2025 | Lee | G06F 16/353 |
| 2025/0307568 | A1* | 10/2025 | Seuss | G06F 16/345 |
| 2025/0342181 | A1* | 11/2025 | Mass | G06F 16/3329 |
| 2025/0371069 | A1* | 12/2025 | Mondal | G06F 16/438 |
| 2026/0010556 | A1* | 1/2026 | Jade | G06F 16/345 |
| 2026/0119540 | A1* | 4/2026 | Yuen | G06F 16/3329 |

FOREIGN PATENT DOCUMENTS

| | | | |
|---|---|---|---|
| KR | 102658967 B1 * | 4/2024 | G06F 16/3329 |
| WO | 2023161630 | 8/2023 | |

OTHER PUBLICATIONS

Nova: An Iterative Planning and Search Approach to Enhance Novelty and Diversity of LLM Generated Ideas, Hu et al (Year: 2024).*

Multi-Document Summarization Using LLAMA 2 Model with Transfer Learning, Sunikumar et al (Year: 2024).*

An Interdisciplinary Outlook on Large Language Models for Scientific Research, Bokyo et al (Year: 2003).*

An Empirical Study on Self-correcting Large Language Models for Data Science Code Generation, Quoc et al (Year: 2024).*

LimGen: Probing the LLMs for Generating Suggestive Limitations of Research Papers, Faizullah et al (Year: 2024).*

Lu et al., The AI Scientist: Towards Fully Automated Open-Ended Scientific Discovery, Sep. 1, 2024.

* cited by examiner

300

Conventional SepFormer-based speech separation uses a fixed-size (250-sample) sliding window to chunk the encoded time axis, which may be sub-optimal for varying speech content. This study investigates whether enabling the model to learn and place chunk boundaries adaptively can outperform or be more efficient than this fixed-chunk approach.

FIG. 3

AUTOMATED REPORT GENERATION

CROSS REFERENCE TO OTHER APPLICATIONS

This application claims priority to U.S. Provisional Patent Application No. 63/729,820 entitled ARTIFICIAL INTELLIGENCE SYSTEM FOR SCIENTIFIC LITERATURE SEARCH, HYPOTHESIS CREATION, METHODOLOGY DESIGN, AND AUTOMATED EXPERIMENTATION filed Dec. 9, 2024 which is incorporated herein by reference for all purposes.

BACKGROUND OF THE INVENTION

Recent advances in artificial intelligence have led to the development of large language models (LLMs) capable of interpreting, synthesizing, and generating human-like text across a wide range of domains. These models, when paired with autonomous AI agents, have demonstrated the ability to process vast corpora of scientific literature, generate code, and perform complex reasoning tasks. However, the practical application of LLMs and AI agents to scientific research remains constrained by several technical limitations, mainly the size of context windows available to LLMs, which restricts the amount of information that can be simultaneously analyzed and reasoned over. As the volume of scientific literature continues to grow exponentially, researchers and automated systems alike face increasing difficulty in efficiently retrieving, synthesizing, and validating relevant information needed for hypothesis generation and experimental design.

The process of writing a high-quality research paper is inherently time-consuming and labor-intensive, often requiring months of manual effort to review literature, formulate novel ideas, design experiments, execute code, analyze results, and compile findings into a publishable format. Traditional workflows are further hampered by the need to recursively trace citations, manage large datasets, and ensure the accuracy and reproducibility of results.

BRIEF DESCRIPTION OF THE DRAWINGS

Various embodiments of the invention are disclosed in the following detailed description and the accompanying drawings.

FIG. 3 displays an example of an idea generated by a process for automated report generation in accordance with some embodiments.

DETAILED DESCRIPTION

Figure 1:
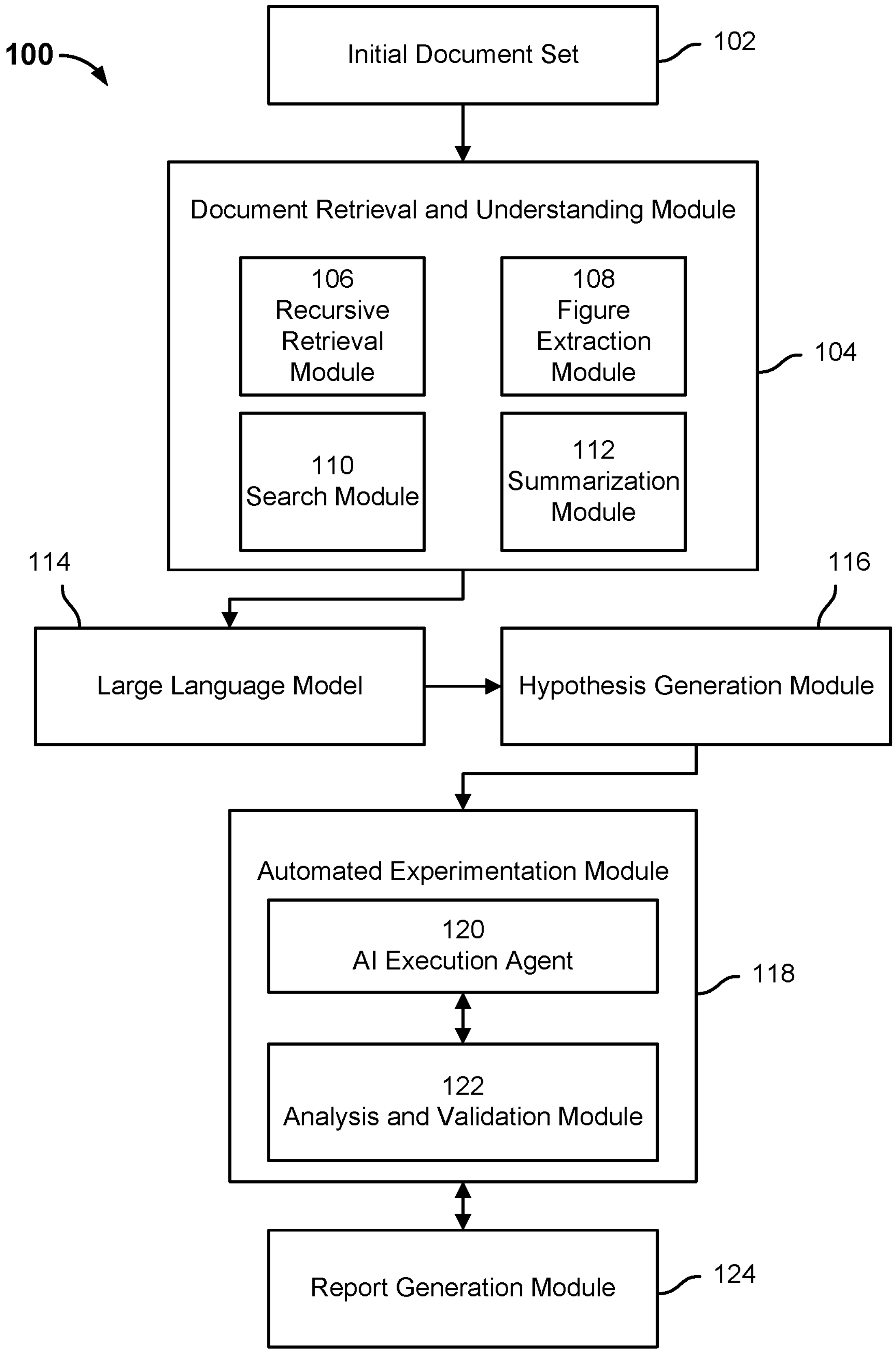
FIG. 1 is a block diagram illustrating a system for automated report generation in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Modern scientific research involves reading, analyzing, and synthesizing vast amounts of literature to formulate hypotheses, design experiments, and evaluate results. As the amount of scientific literature vastly outpaces the speed with which human researchers can keep up, the ability for research scientists to effectively complete these tasks decreases meaningfully. There exists a need for an automated system that assists or fully automates research scientists in these processes, reducing time spent on manual tasks while enhancing the quality and innovation in research.

Systems and methods for improved automated technical report generation are disclosed herein. Existing approaches for using large language models (LLMs) and artificial intelligence (AI) agents are limited by the computational architecture of such models, specifically, fixed-size context windows, inefficient token utilization, and uncontrolled recursive retrieval that introduce latency and loss of relevant context when reasoning over large or heterogenous document sets. These are technical limitations in the operation of computing systems, not merely inefficiencies in human research activity. The systems and methods disclosed herein therefore improve the functioning of computers themselves by introducing recursive-retrieval control, summarization compression, and context-window optimization mechanisms that enhance processing efficiency. As a result, LLMs can reason across datasets exceeding their native context capacity while reducing token overflow, improving inference throughput, and increasing accuracy and reliability of automated technical-report generation.

Automated technical report generation includes utilizing a large language model to generate one or more new ideas, where utilizing the large language model to generate the new ideas includes obtaining an initial set of documents.

Utilizing the large language model to generate the new ideas further includes obtaining one or more other documents related to the initial set of documents. In some embodiments, obtaining one or more other documents cited by the initial set of documents includes utilizing a search engine to retrieve the one or more other documents. In some embodiments, utilizing the large language model to generate the new idea further includes obtaining one or more other documents related to the one or more documents related to the initial set of documents. In some embodiments, utilizing the large language model to generate the new idea further includes performing a web search to obtain one or more relevant documents based on the content and domain of the initial set of documents.

Utilizing the large language model to generate the new ideas further includes providing the initial set of documents and the obtained documents to the large language model to generate new ideas based on the documents. In some embodiments, generating the new ideas includes systematically perturbing a baseline configuration along a predefined set of dimensions to generate candidate ideas. In some embodiments, generating the new ideas further includes selecting and recombining components from a library of method primitives to form new candidate methodologies. In some embodiments, generating the new ideas includes applying evolutionary operations, including mutation and crossover, to a population of existing ideas. In some embodiments, generating the new ideas includes sampling new ideas according to an acquisition function over a surrogate performance model. In some embodiments, generating the new ideas includes identifying failure patterns in prior results and generating targeted modifications to address the detected failures. In some embodiments, generating the new ideas includes retrieving descriptions of methods in related technical domains and generating analogous methodologies for the current domain. In some embodiments, generating the new ideas includes solving a constrained optimization problem over a space of candidate methodologies. In some embodiments, generating the new ideas includes forming a multidimensional matrix of methodological attributes and instantiating ideas from combinations of attribute values. In some embodiments, generating the new ideas includes generating candidate ideas through simulated collaboration among multiple artificial intelligence personas with differing expertise.

In some embodiments, utilizing the large language model to generate the new ideas further includes generating summaries of the initial set of documents and the one or more other documents. In some embodiments, utilizing the large language model to generate the new idea further includes providing the summaries of the initial set of documents and the one or more other documents to the large language model. In some embodiments, utilizing the large language model to generate the new idea further includes generating two or more ideas and selecting a best idea from the two or more ideas. In some embodiments, selecting the best idea includes prompting a large language model to compare the two or more ideas based on predefined criteria.

In some embodiments, the predefined criteria include novelty of the idea, access to resources needed to execute the idea (e.g., data storage capacity, GPUs, virtual machines, etc.), infrastructure compatibility, result interpretability, ethical considerations, risk level, experimental reproducibility, time to implement/validate, maintainability of the system, “coolness” sentiment score, recency of generation, syntactic complexity, robustness across datasets, implementation complexity, result interpretability, and/or alignment with objectives. As such, the systems and methods described herein improve the technical field of artificial intelligence and large language models by efficiently predicting resource constraints to optimize the process of generating a technical report and research paper.

Automated technical report generation further includes executing intermediate states of the new ideas using an artificial intelligence (AI) agent. In some embodiments, utilizing the AI agent to execute the new ideas includes extracting a methodology based on the idea and generating artifacts according to the methodology. In some embodiments, a large language model is utilized to validate the results of executing the ideas. In some embodiments, validating the results of executing the ideas includes analyzing the generated artifacts. In some embodiments, upon determining that the results of executing the idea are not validated, issues in the generated artifacts are resolved and the idea is executed again. The results of executing the ideas may be based on a quality such as scientific robustness.

In some embodiments, the AI agent receives a research proposal as input for executing the idea. In some embodiments, the research proposal is generated by prompting a large language model to generate a research proposal based on the new idea.

In some embodiments, automated technical report generation further includes generating, using the large language model, a technical report. In some embodiments, the technical report comprises one or more artifacts that conform to a particular format (e.g., code, figures, research notes, results, data, tables, logs, thoughts, files, documents, structured outputs, etc.).

In some embodiments, automated technical report generation further includes utilizing a large language model to generate a research paper based on the technical report. In some embodiments, the research paper is generated directly without first generating a technical report. In some embodiments, the length of the technical report is limited to a number of tokens comprising the size of the context window of the large language model utilized to generate the research paper.

FIG. 1 is a block diagram illustrating a system for automated technical report generation in accordance with some embodiments. In the example shown, system 100 includes initial document set 102, document retrieval and understanding module 104, large language model 114, hypothesis generation module 116, automated experimentation module 118, and report generation module 124.

Initial document set 102 is a set of documents, such as research papers or articles. In some embodiments, initial document set 102 is provided by a user. In some embodiments, the user provides initial document set 102 through a user interface on a client device (e.g., a phone, a laptop, a tablet, a desktop computer, etc.). In some embodiments, the documents in initial document set 102 are related to each other based on a common domain for which the user wants to generate a new idea.

Document retrieval and understanding module 104 may be implemented on a server, cloud server, a virtual machine running on a server, etc. Document retrieval and understanding module 104 is configured to receive initial document set 102. In some embodiments, document retrieval and understanding module 104 is configured to download the documents in initial document set 102 and convert them into a common format. Document retrieval and understanding module 104 includes recursive retrieval module 106, figure extraction module 108, search module 110, and summarization module 112. Recursive retrieval module 106, figure extraction module 108, search module 110, and summarization module 112 may be implemented on a server, cloud server, a virtual machine running on a server, etc.

Recursive retrieval module 106 is configured to recursively retrieve one or more other documents related to the documents in initial document set 102. In some embodiments, recursive retrieval module is further configured to recursively retrieve one or more other documents cited by the one or more documents cited by initial document set 102.

In some embodiments, recursively retrieving the one or more documents includes utilizing a web search engine to retrieve the one or more documents. In some embodiments, the search engine is associated with search module 110. Search module 110 may be configured to search for documents based on the citations. Search module 110 may be further configured to perform a web search to retrieve one or more additional documents based on relevant keywords, the content, or the domain of the initial set of documents.

Figure extraction module 108 is configured to extract figures (e.g., tables, charts, diagrams, images, etc.). from documents in initial document set 102. In some embodiments, figure extraction module 108 further extracts figures from documents retrieved through either recursive retrieval module 106 or search module 110.

Summarization module 112 is configured to generate summaries of each of the documents in initial document set 102. In some embodiments, summarization module 112 is further configured to generate summaries of one or more additional documents retrieved by recursive retrieval module 106 or search module 110. In some embodiments, the summaries include information about figures extracted using figure extraction module 108.

Large language model 114 may be a public, private, or hybrid large language model. Large language model 114 is configured to receive initial document set 102 and the one or more other documents from document retrieval and understanding module 104 and generate a new idea. In some embodiments, document retrieval and understanding module provides summaries generated by summarization module 112 to large language model 114. In some embodiments, large language model 114 is further configured to receive a query or prompt with instructions to generate a new idea.

Large language model 114 is associated with a context window which may limit the amount of information which may be used as context in generating text. In some embodiments, the context window is limited to a particular number of tokens. Providing summaries instead of entire documents to the context window associated with large language model 114 improves the capacity of the large language model by allowing it to incorporate a wider range of information into responses. As such, the ideas generated by large language model 114 are more likely to be novel and important in the context of recent research in the domain.

Large language model 114 is further configured to provide the generated new idea to hypothesis generation module 116. Hypothesis generation module 116 may be implemented on a server, cloud server, a virtual machine running on a server, etc. In some embodiments, large language model 114 is configured to generate two or more potential new ideas and provide the two or more potential new ideas to hypothesis generation module 116. In some embodiments, hypothesis generation module 116 is configured to select a best idea from the two or more potential new ideas. In some embodiments, selecting the best idea includes prompting a large language model associated with hypothesis generation module 116 to compare the two or more ideas based on predefined criteria. In some embodiments, the predefined criteria include novelty of the idea and access to resources needed to execute the idea.

Hypothesis generation module 116 is configured to, based on the new idea generated by large language model 114 or a selected best idea from two or more potential new ideas generated by large language model 114, generate a hypothesis for experimentation and execution.

FIG. 3 displays an example of an idea generated by a process for automated technical report generation in accordance with some embodiments. In the example shown, idea 250 may be a hypothesis generated by hypothesis generation module 116.

In some embodiments, hypothesis generation module 116 is further configured to, based on a generated hypothesis, generate a research proposal. In some embodiments, the research proposal is generated based on the new idea.

Hypothesis generation module 116 is configured to provide the idea generated by language model 114 or the selected best idea of two or more potential ideas generated by large language model 114 and/or a generated hypothesis, and/or a research proposal based on the hypothesis to automated experimentation module 118.

Automated experimentation module 118 may be implemented on a server, cloud server, a virtual machine running on a server, etc. Automated experimentation module 118 is configured to execute the new idea based on the idea, hypothesis, and/or research proposal provided by hypothesis generation module 116. Executing the new idea may include utilizing AI execution agent 120 and analysis and validation module 122. AI execution agent may be an automated software engineer (e.g., Devin, FactoryIO, etc.).

AI execution agent 120 is configured to generate artifacts for executing the new idea. In some embodiments, automated experimentation module 118 further includes a vision processing component for generating figures. In some embodiments, AI execution agent 120 is configured to extract a methodology based on the received idea, hypothesis, and/or research proposal and generate the code and the figures according to the methodology.

Analysis and validation module 122 is configured to analyze and validate the artifacts generated by AI execution agent 120 based on predetermined criteria. In some embodiments, upon determining that the results of executing the idea are not validated, analysis and validation module 122 prompts AI execution agent 120 to resolve issues in the generated artifacts and re-execute the idea.

Automated experimentation module 118 is further configured to provide the results of executing the idea (i.e., the artifacts) to report generation module 124. Report generation module 124 may be implemented on a server, cloud server, a virtual machine running on a server, etc. Report generation module 124 is configured to generate a technical report that conforms to a particular format. The technical report may include a summary of the artifacts generated by automated experimentation module 118, the hypothesis or research proposal generated by hypothesis generation module 116, and/or additional context related to initial document set 102 and the one or more documents retrieved by document retrieval and understanding module 104.

In some embodiments, report generation module 124 includes a large language model utilized to generate the technical report. In some embodiments, the large language model may be further utilized to generate a research paper based on the technical report. In some embodiments, the length of the technical report is limited to a number of tokens comprising the size of the context window of the large language model utilized to generate the research paper.

Figure 2:
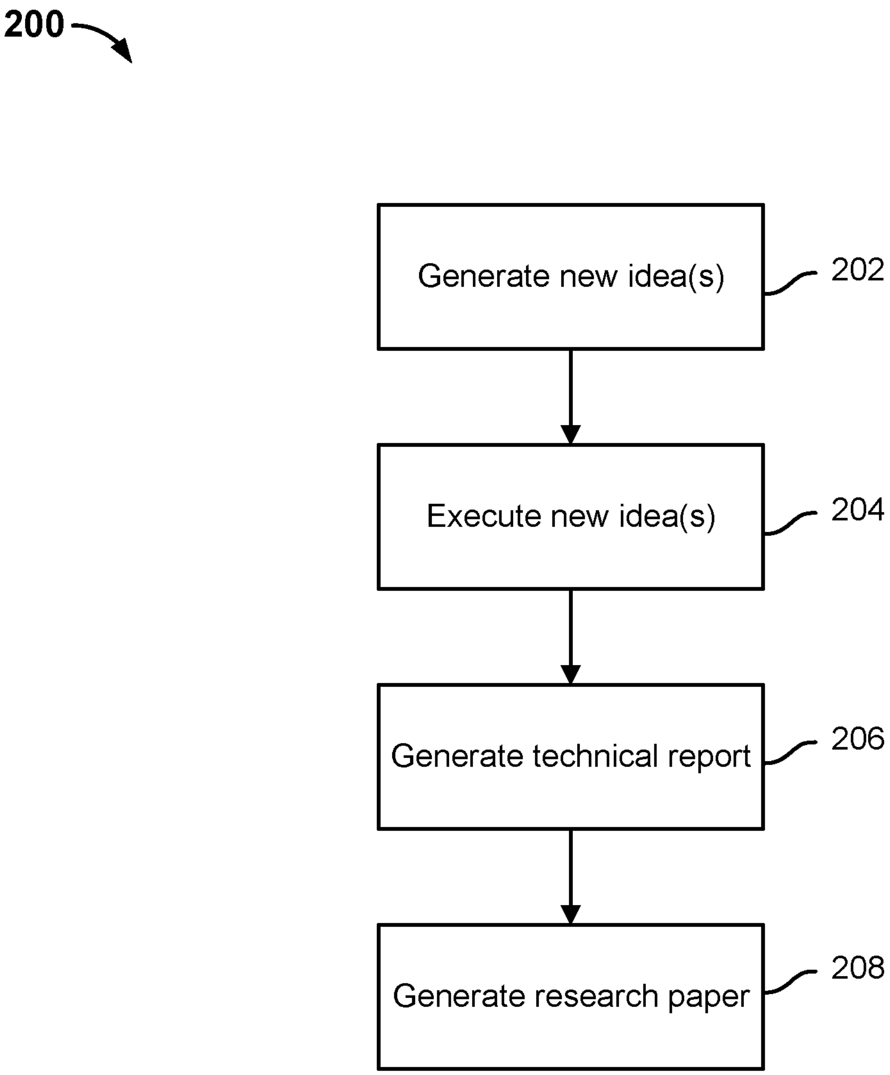
FIG. 2 is a flow diagram illustrating a process for automated report generation in accordance with some embodiments.

FIG. 2 is a flow diagram illustrating a process for automated technical report generation in accordance with some embodiments. In the example shown, process 200 may be executed by a system for automated technical report generation such as system 100.

At 202, one or more new ideas are generated. Generating a new idea may be performed by utilizing a large language model, such as large language model 114, and/or a hypothesis generation module, such as hypothesis generation module 116. Generating one or more new ideas may include obtaining an initial document set, such as initial document set 102. The initial document set may be a set of documents such as research papers or articles. In some embodiments, the initial document set is provided by a user. In some embodiments, the user provides the initial document set through a user interface on a client device (e.g., a phone, a laptop, a tablet, a desktop computer, etc.). In some embodiments, the documents in the initial document set are related to each other based on a common domain for which the user wants to generate a new idea. In some embodiments, receiving the initial document set includes downloading the documents in the initial document set and converting them into a common format.

Generating one or more new ideas may further include obtaining one or more other documents related to the initial document set (e.g., cited by a document included in the initial document set) using a document retrieval and understanding module such as document retrieval and understanding module 104. In some embodiments, a web search engine is utilized to obtain the one or more other documents. In some embodiments, a web search is performed to obtain the one or more other documents based on relevant keywords, the content, or the domain of the initial set of documents.

In some embodiments, one or more other documents cited by the one or more documents cited by the initial document set are recursively retrieved. In some embodiments, recursively retrieving the documents includes extracting figures (e.g., tables, charts, diagrams, images, etc.) from the documents in initial document set or the one or more other documents.

In some embodiments, the other documents are semantically or contextually related, share topical tags, or be published in the same workshop, conference, or publication (e.g., journal).

The initial set of documents and the one or more other documents may be provided to a context window associated with the large language model utilized to generate the new idea based on the provided documents.

In some embodiments, generating the one or more new ideas further includes receiving, by the large language model, a query or prompt with instructions to generate a new idea. In some embodiments, two or more ideas are generated by the large language model, and a best idea is selected. In this case, the best idea may be selected by a hypothesis generation module such as hypothesis generation module 116. In some embodiments, a research proposal is generated based on the new idea.

In some embodiments, the large language model is prompted with the initial set of documents to generate a set of keywords or concepts associated with the initial set of documents. These keywords/concepts may be used to perform a search across one or more document sources and the highest-ranked results (e.g., top 10) may be retrieved as candidates to be included in the one or more other documents.

In some embodiments, the one or more other documents include other document(s) authored by author(s) associated with the initial set of documents, as well as documents related to those authors' additional works.

The large language model may perform a web search to obtain the one or more other documents related to the initial set of documents.

In some embodiments, the system may generate vector embeddings for all available documents and use those embeddings to identify similar documents (e.g., cosine similarity, dot product, Euclidean distance). A computationally efficient language model may be used to review large volumes of documents and determine candidate documents to include in the initial set of documents and/or the one or more other related documents.

At 204, the one or more new ideas are executed. The new idea may be executed by an AI agent, such as AI execution agent 120, which may be part of an automated experimentation module such as automated experimentation module 118. In some embodiments, executing the new idea includes generating artifacts. In some embodiments, executing the new idea includes extracting a methodology based on the received idea, hypothesis, and/or research proposal and generate the code and the figures according to the methodology.

In some embodiments, the execution may be validated. Validation may be performed by an analysis and validation module, such as analysis and validation module 122, configured to analyze and validate the code and the figures generated when executing the new idea. In some embodiments, upon determining that the results of executing the idea are not validated, the idea may be executed again. In some embodiments, executing the idea again includes resolving issues with the initially generated artifacts.

Validating the results may include performing a plurality of validation checks. The validation checks may include passing checks may include checking for bugs, determining scientific integrity, ensuring that the correct figures were generated, evaluating accuracy based on one or more metrics or a combination of metrics used to evaluate any models used. The validation checks may further include using a large language model to evaluate the codebase organization in files and folders used to store generated artifacts. Issues in the generated artifacts, or any other outputs of executing the idea (e.g., codebase file structure and organization) are resolved. Resolving the issues may include using the AI agent. Evaluating the file structure may further include ensuring that large files (e.g., entire databases) are not included. Not including large files helps to optimize space in a context window associated with the validator or a large language model used to generate a technical report based on generated artifacts.

In some embodiments, validating the results of executing the idea further includes evaluating the integrity of the training process itself, such as confirming completion without errors, appropriate metric behavior, and adherence to scientific-rigor criteria. These validation signals may be provided to a scoring function or reward model to influence whether the experiment is accepted, retried, or terminated early.

Validating the results of executing the intermediate states of the new ideas includes assessing those results based on scientific robustness. Scientific robustness may be measured by evaluating reproducibility across multiple runs, sensitivity of results to perturbations, statistical significance of observed improvements, consistency across datasets or evaluation splits, agreement with known scientific findings, comparison against baseline models, or by utilizing a learned evaluator configured to assess the methodological soundness and stability of the results.

At 206, a technical report is generated based on the one or more validated ideas. Generating the technical report may be done by a report generation module configured to generate a technical report that conforms to a particular format, such as report generation module 124. The technical report may be generated using the outputs of executing the idea (e.g., generated artifacts, codebase file structure and organization, code documentation, summaries, function headers, etc.) as inputs to a large language model utilized to generate the report. The technical report may include a summary of the code and the figures generated in executing the idea, the original hypothesis or research proposal, and/or additional context related to the new idea.

At 208, a research paper is generated based on the technical report. In some embodiments, generating the research paper includes prompting a large language model with instructions to generate a research paper which conforms to a scientific research format. In some embodiments, the research paper adheres to a format with predefined sections (e.g., Abstract, Introduction, Background, Dataset, Methodology, Results, Discussion, Conclusion). In some embodiments, the large language model generates all sections of the research paper at once (i.e., one-shot). In some embodiments, the large language model generates the research paper one section at a time. In some embodiments, the large language model iteratively improves drafts of the written sections or paper.

Figure 4:
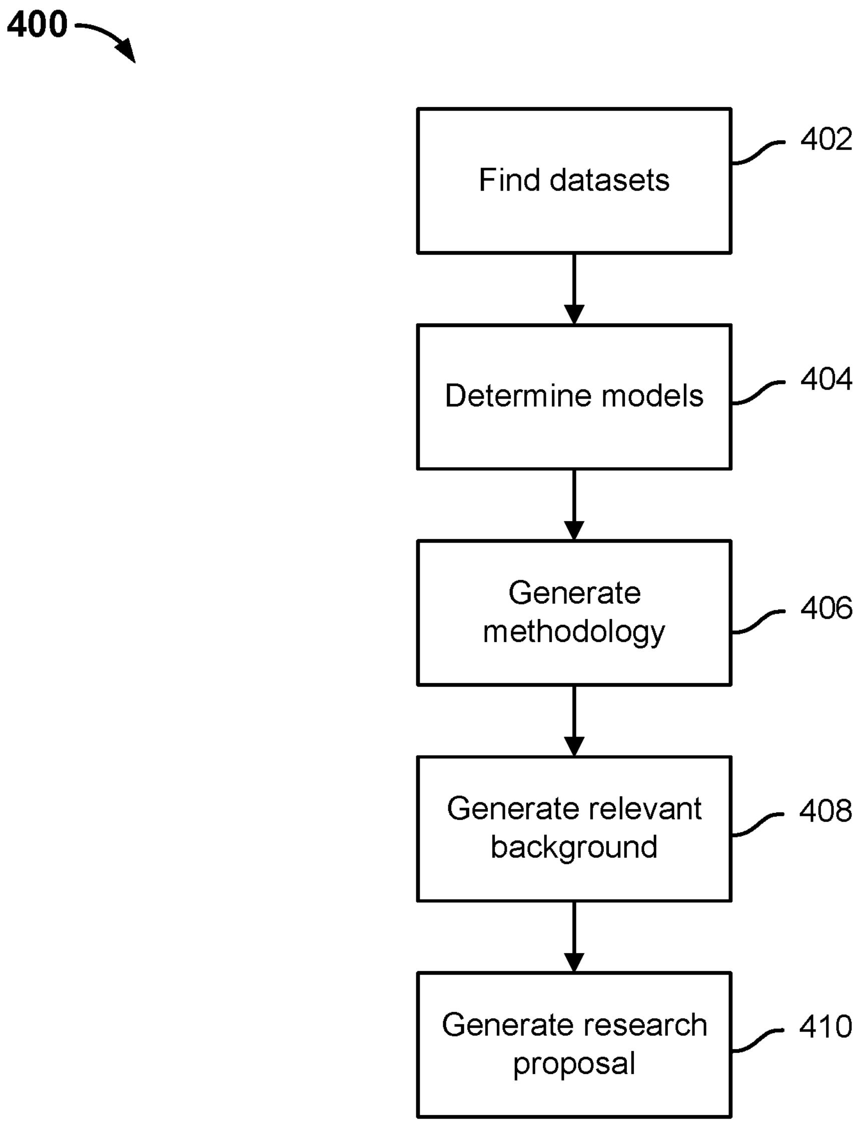
FIG. 4 is a flow diagram illustrating a process for generating a research proposal based on an idea in accordance with some embodiments.

FIG. 4 is a flow diagram illustrating a process for generating a research proposal based on an idea in accordance with some embodiments. In the example shown, process 400 may be executed by a hypothesis generation module such as hypothesis generation module 116. In some embodiments, the research proposal may be generated by a large language model based on instructions provided in a prompt.

At 402, potential datasets which may be used in executing an idea provided to the hypothesis generation module are found. Finding the datasets may include using a web search tool or a search module, such as search module 110, to find datasets relevant to the idea. In some embodiments, the web search tool is associated with a large language model.

At 404, one or more AI models which may be used in executing the idea are determined. In some embodiments, the determination of which models to use is based on predefined criteria including the amount of compute resources available to the AI agent, such as AI execution agent 120, configured to execute the idea based on the research proposal. In some embodiments, determining the models includes determining which hyperparameters to use for experimentation.

At 406, a methodology including the potential datasets and the determined models is generated. In some embodiments, generating the methodology includes determining which models are baseline models as well as which metrics should be used for evaluating any experiments conducted using the models. In some embodiments, generating the methodology includes determining which figures should be generated.

At 408, relevant background is generated. In some embodiments, the relevant background includes information from an initial document set and any recursively retrieved documents used in generating the idea. In some embodiments, the relevant background includes summaries of related documents produced by a summarization module such as summarization module 112. In some embodiments, the relevant background further encompasses formal or quantitative representations of the techniques described herein.

At 410, a research proposal is generated. In some embodiments, the research proposal is generated by a large language model based on context from the datasets, models, methodology, and relevant background obtained in steps 402-408. In some embodiments, generating the research proposal includes concatenating information about the datasets, models, methodology, and relevant background obtained in steps 402-408.

Automated Experimentation and Evaluation of Machine Learning Solutions

In a system for automated report generation, it is important to keep machine learning codebases up to date with state-of-the-art scientific publications. As such, there exists a need for not only generating candidate improvements but also continuously ingesting and evaluating new research, intelligently matching innovations to user-specific codebases, and rigorously testing and integrating only those changes that demonstrably improve performance. Accordingly, for the systems and methods for automated report generation disclosed herein include automated experimentation and evaluation of machine learning models, providing a framework for ongoing, literature-driven optimization of machine learning codebases.

Automated experimentation and evaluation of machine learning solutions includes determining that a document is relevant to a machine learning problem. The document may be a text (e.g., publications, articles, books, webpages, natural-language prompts, messages, logs), tabular data (e.g., spreadsheets, databases), images or graphics (e.g., photographs, diagrams, plots, user interfaces), audio (e.g., speech recordings, sound files), video or animation, software artifacts (e.g., source code, executables, scripts, configuration files, code repositories), datasets or data streams (e.g., sensor data, telemetry, event logs, time-series), machine-learning artifacts (e.g., models, checkpoints, weights, embeddings, training corpora), ideas or concepts encoded in any such form, the output of an AI model or software which uses AI models, as well as any collection, subset, aggregation, or combination of the foregoing. The machine learning problem may be associated with a codebase including one or more solutions to the machine learning problem. The solutions to the machine learning problem may be machine learning models.

Determining that the document is relevant to the machine learning problem may include performing a document search. Determining that the document is relevant to the machine learning problem may further include extracting key contributions, code snippets, and information from associated figures based on results from the document search and performing a semantic search on the extracted key contributions, code snippets, and information from associated figures.

Automated experimentation and evaluation of machine learning solutions further include utilizing an autonomous research agent to conduct an experiment related to the machine learning problem based on information included in the document. In some embodiments, the autonomous research agent is configured to receive the relevant document and a machine learning codebase and perform an experiment according to instructions provided in an evaluation harness associated with the codebase. The evaluation harness may be a script which includes instructions for what to output as part of the machine learning solution (e.g., code, model weights, hyperparameters, etc.) The autonomous research agent or a large language model associated with the autonomous research agent may be further utilized to generate one or more additional experiments based on the document and the machine learning codebase. In some embodiments, the autonomous research agent conducts the experiment based on a generated summary of the document.

Automated experimentation and evaluation of machine learning solutions further include evaluating the conducted experiment. In some embodiments, the conducted experiment is evaluated using a scoring function with respect to a scoring threshold. In some embodiments, the scoring threshold is based on performance respective to a chosen evaluation metric associated with the machine learning codebase (e.g., testing accuracy of machine learning models with respect to the dataset, cost of training and testing models with respect to available compute resources, etc.).

Automated experimentation and evaluation of machine learning solutions further includes updating a solution to the machine learning problem based on the evaluation of the conducted experiment. In some embodiments, the solution is a machine learning model. In some embodiments, the solution is related to machine learning infrastructure (e.g., GPU kernels).

Updating the solution may include updating a machine learning codebase associated with the machine learning problem. In some embodiments, the machine learning codebase is updated only if the conducted experiment achieves a score exceeding a scoring threshold. The scoring function may be a machine learning model, a chosen evaluation metric (e.g., accuracy, time, etc.), a deterministic evaluation, etc. In some embodiments, the system, including the AI research agent, for evaluating conducted experiments is updated using reinforcement learning based on outcomes of previously conducted experiments. In some embodiments, the scoring function can be used as an objective function to improve any part of the system using reinforcement learning. For example, the system may learn which aspects of the document may lead to rewards with respect to the scoring function. In some embodiments, reinforcement learning signals may come from other sources (e.g., if a user accepts the updated solution in a code repository).

Figure 5:
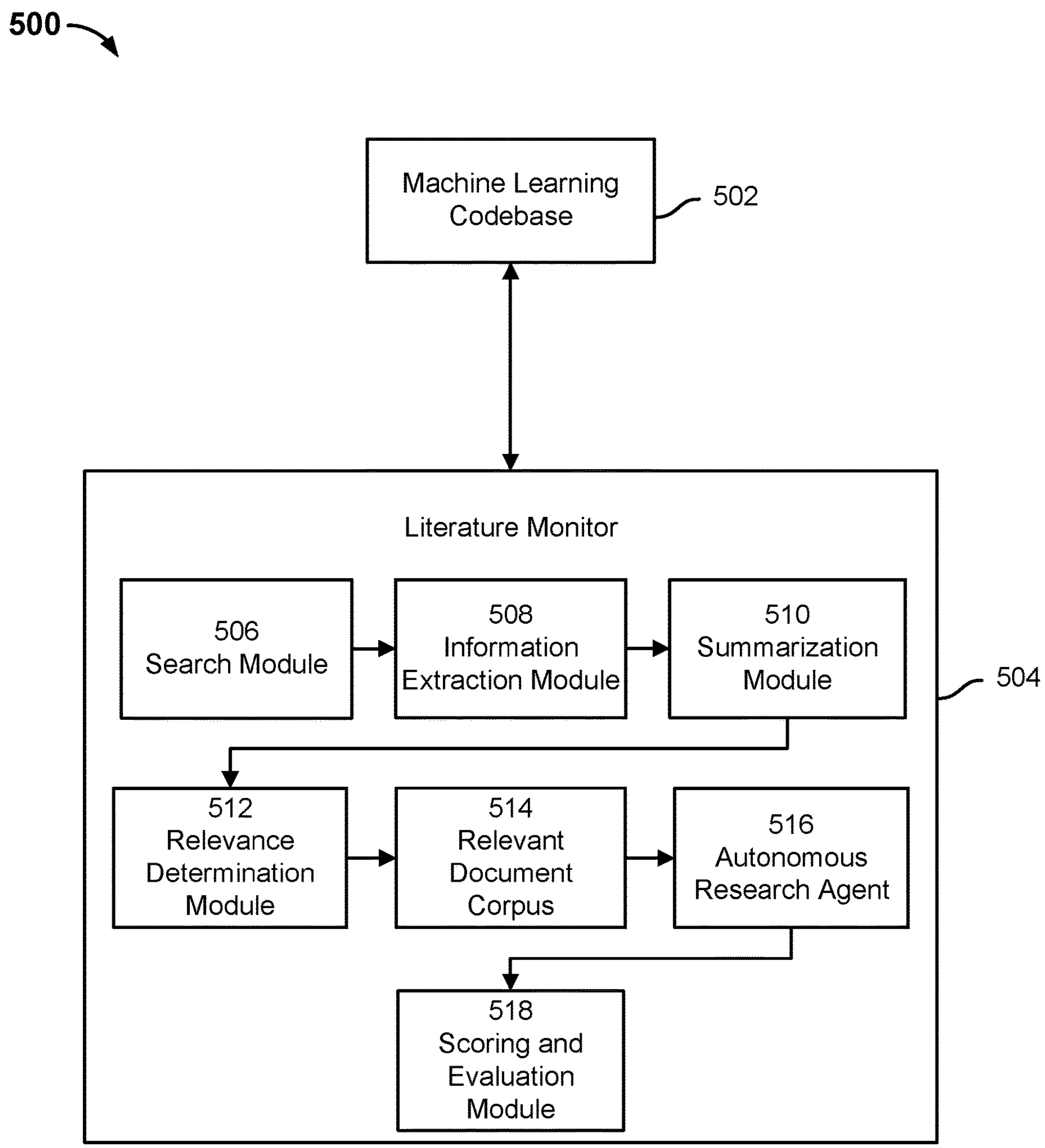
FIG. 5 is a block diagram illustrating a system for automated experimentation and evaluation of machine learning solutions in accordance with some embodiments.

FIG. 5 is a block diagram illustrating a system for automated experimentation and evaluation of machine learning solutions in accordance with some embodiments. In the example shown, system 500 includes machine learning codebase 502 and literature monitor 504. Machine learning codebase 502 includes one or more solutions related to a machine learning problem. In some embodiments, machine learning codebase 502 is associated with one or more datasets. The one or more datasets may be stored in a database or other type of data store associated with machine learning codebase 502. The one or more datasets may be saved in a text format (e.g., .csv) as part of machine learning codebase 502.

In some embodiments, machine learning codebase 502 is associated with a chosen metric for evaluating experiments related to the codebase (e.g., testing accuracy of machine learning models with respect to the dataset, cost of training and testing models with respect to available compute resources, etc.). Machine learning codebase 502 may contain an evaluation harness, or evaluation script, which is isolated from the codebase and defines how to evaluate experiments performed in the codebase. Isolating the evaluation harness prevents unauthorized modification of evaluation logic or overfitting to test data.

Literature monitor 504 is configured to receive and make updates to machine learning codebase 502 based on scientific literature or other documents. In some embodiments, literature monitor 504 is further configured to receive machine learning documents from a user. In some embodiments, the user is associated with a client device (e.g., a laptop, a tablet, a smartphone, a desktop computer, etc.) which may connect to a system 100 via a user interface or an application programming interface (API).

Literature monitor 504 includes search module 506, information extraction module 508, summarization module 510, relevance determination module 512, relevant document corpus 514, autonomous research agent 516, and scoring and evaluation module 518.

Search module 506 is configured to perform a scientific literature search. Search module 506 may be implemented on a server, cloud server, a virtual machine running on a server, etc. Search module 506 may include a large language model. In some embodiments, search module 506 includes a web search engine configured to perform a web search based on keywords. In some embodiments, a large language model is utilized to extract key words from a document received by literature monitor 504 to perform a keyword-based web search for related documents. In some embodiments, a custom database is created based on results from the scientific literature search. In some embodiments, search module 506 is configured to perform a search using retrieval augmented generation (RAG) or contextual hierarchical summarization techniques are performed on the custom database to extract relevant information for specific queries.

In some embodiments, search module 506 is configured to continually monitor (e.g., hourly, daily, weekly, etc.) machine learning documents (e.g., scientific publications) to keep system 500 up to date.

Information extraction module 608 may be implemented on a server, cloud server, a virtual machine running on a server, etc. Information extraction module 608 is configured to extract key contributions from relevant papers identified by search module 606 using AI summarization models that are prompted to generate concise summaries. In some embodiments, information extraction module 608 includes one or more large language models. In further embodiments, information extraction module 608 may additionally employ simpler heuristic or rule-based techniques, such as keyword matching, term-frequency-inverse-document-frequency (TF-IDF) ranking, bag-of-words classifiers, or regular-expression-based pattern extractors, optionally combined with domain-specific dictionaries, ontologies, or manually curated templates. In certain implementations, information extraction module 608 may also incorporate clustering or topic modeling, ensemble methods that combine outputs from multiple summarizers, user-defined extraction rules, or feedback loops that update extraction policies based on user corrections or relevance signals.

Information extraction module 608 may be further configured to extract information from figures in the relevant papers using vision models trained or prompted to interpret and summarize graphical data in scientific papers. In some embodiments, this includes chart-type classification (e.g., bar chart, scatter plot, Kaplan-Meier curve), axis and legend parsing, optical character recognition (OCR) for embedded text, and data point extraction to reconstruct approximate underlying numerical values. In additional embodiments, information extraction module 608 may apply generic image-processing techniques such as denoising, contrast enhancement, edge detection, or template matching to improve robustness to low-quality scans, as well as layout analysis to detect panel boundaries, captions, and callouts in multi-panel figures. In certain implementations, information extraction module 608 may generate intermediate visual summaries (e.g., downsampled thumbnails, overlaid bounding boxes, or simplified plots) for quality control, visualization, or downstream consumption by other modules.

In some embodiments, information extraction module 608 is configured to extract code snippets or methodology descriptions from the relevant papers to enhance reproducibility or to suggest improvements to existing projects. For example, the module may identify and normalize pseudocode, configuration files, or shell commands, infer missing implementation details, and map them to standardized pipeline templates (e.g., data preprocessing, model training, evaluation). In further embodiments, information extraction module 608 may also employ regular-expression-based pattern matching, language-agnostic tokenization, or generic static analysis tools to locate and segment code blocks, detect references to software libraries, or identify environment specifications such as package managers and container images. In certain implementations, information extraction module 608 may treat methodology descriptions as free text and apply generic sequence-tagging, dependency-parsing, or information-retrieval techniques to extract experimental settings, while optionally logging extracted artifacts into a structured store or version-controlled repository for later inspection, auditing, or reuse.

In some embodiments, information extraction module 508 is configured to use embedding models (e.g., Word2Vec) to build sparse embeddings for each relevant paper and compare the sparse embeddings to sparse embeddings built for a publication received by literature monitor 504. After the top results have been found, more dense embeddings of the query and each document may then be compared. More dense embeddings may continue to be progressively compared and trimmed until a small number of documents is reached (e.g., less than a threshold number of documents).

Summarization module 510 is configured to, based on the information extracted by information extraction module, generate summaries of the relevant papers identified in the scientific literature search performed by search module 506. Summarization module 510 may be implemented on a server, cloud server, a virtual machine running on a server, etc. Summarization module may include a large language model. In some embodiments, summarization module 510 may include a parsing module to parse mathematical symbols into a typesetting system (e.g., LaTex) that is understood by the large language model.

Relevance determination module 512 may be implemented on a server, cloud server, a virtual machine running on a server, etc. Relevance determination module 512 may include a large language model. Relevance determination module 512 is configured to determine whether a publication received by literature monitor 504, or any other document found by search module 506, is relevant to machine learning codebase 502. Relevance determination module 512 may perform these determinations for each document in parallel. In some embodiments, the relevance determinations are made based on summaries generated by summarization module 510. In some embodiments, entire publications are provided to relevance determination module 512.

Relevant document corpus 514 is a custom corpus of literature provided by a user to literature monitor 504 or identified by search module 506 and determined to be relevant to machine learning codebase 502 by relevance determination module 512. Relevant document corpus 514 may be implemented as a list or a database. Relevant document corpus 514 may contain entire documents, condensed formats of documents (e.g., JSON, summaries generated by summarization module 510), or information extracted from documents by information extraction module 508. In some embodiments, relevant document corpus 514 is configured to avoid duplication of information. In some embodiments, relevant document corpus 514 includes a large language model configured to process portions of relevant documents prior to storing the documents. In some embodiments, relevant document corpus 514 is reorganized into a knowledge graph.

Autonomous research agent 516 may be implemented on a server, cloud server, a virtual machine running on a server, etc. Autonomous research agent 516 may include a large language model. In some embodiments, autonomous research agent 516 is an autonomous software engineer (e.g., Devin, FactoryIO, etc.). Autonomous research agent 516 is configured to conduct an experiment related to machine learning codebase 502 based on information included in a relevant publication or document. In some embodiments, the relevant publication is a publication from relevant document corpus 514. In some embodiments, the experiment may include code or machine instructions for training a machine learning model on a dataset. Autonomous research agent 516 may conduct the experiment based on a generated summary of the publication. Autonomous research agent 516 may be provided with only the relevant sections of machine learning codebase 502 to conduct the experiment. Autonomous research agent 516 may be equipped with one or more tools to accommodate specific needs of the agent when conducting the experiment.

In some embodiments, autonomous research agent 516 is configured to modify only a portion of a machine learning codebase while maintaining other portions unchanged. For example, the optimization or training file may be modified by autonomous research agent 516 while the rest of the code remains unchanged. In some embodiments, different portions of the machine learning codebase have their own corresponding scoring function.

Scoring and evaluation module 518 may be implemented on a server, cloud server, a virtual machine running on a server, etc. Scoring and evaluation module 518 may include a large language model. Scoring and evaluation module 518 is configured to evaluate the experiment conducted by autonomous research agent 516 with respect to a scoring threshold. In some embodiments, the scoring threshold is based on performance respective to a chosen evaluation metric associated with the machine learning codebase (e.g., testing accuracy of machine learning models with respect to the dataset, cost of training and testing models with respect to available compute resources, etc.). In some embodiments, evaluating the experiment includes computing a score based on a chosen metric (e.g., testing accuracy of machine learning models with respect to the dataset, cost of training and testing models with respect to available compute resources, etc.) associated with machine learning codebase 502. Scoring and evaluation module 518 may be further configured to use an evaluation script included in machine learning codebase 502.

In some embodiments, in response to determining that the score assigned by scoring and evaluation module 518 indicates that the conducted experiment improves the solution to the machine learning problem, literature monitor 504 is configured to update machine learning codebase 502. In some embodiments, updating machine learning codebase 502 includes adding code related to conducting the experiment (i.e., code generated by autonomous research agent 516) to machine learning codebase 502. In some embodiments, updating machine learning codebase 502 includes replacing code in machine learning codebase 602.

In some embodiments, scoring and evaluation module 518 includes a reward model configured to evaluate partial or intermediate states (e.g., draft code changes, document changes, artifacts, early training results, or preliminary experiment outputs) to predict their likelihood of yielding a favorable final score. Based on this prediction, the system 500 selectively allocates additional computational resources to promising candidates while reducing or terminating execution for those deemed unlikely to be productive, thereby improving compute efficiency. In some embodiments, the reward model is an off-the-shelf language model prompted to assess whether to continue pursuing the intermediate state or a model trained using scoring functions for experiments. In some embodiments, auxiliary reward signals are provided to train the autonomous research agent 516 without requiring full execution of the intermediate state, thereby reducing compute and time.

In some embodiments, system 500 further includes a user interface or dashboard which facilitates user interaction with the system. The user interface may be used to present relevant machine learning documents to a user, allow a user to upload machine learning documents to system 500, or allow a user to trigger web searches using search module 606.

Figure 6:
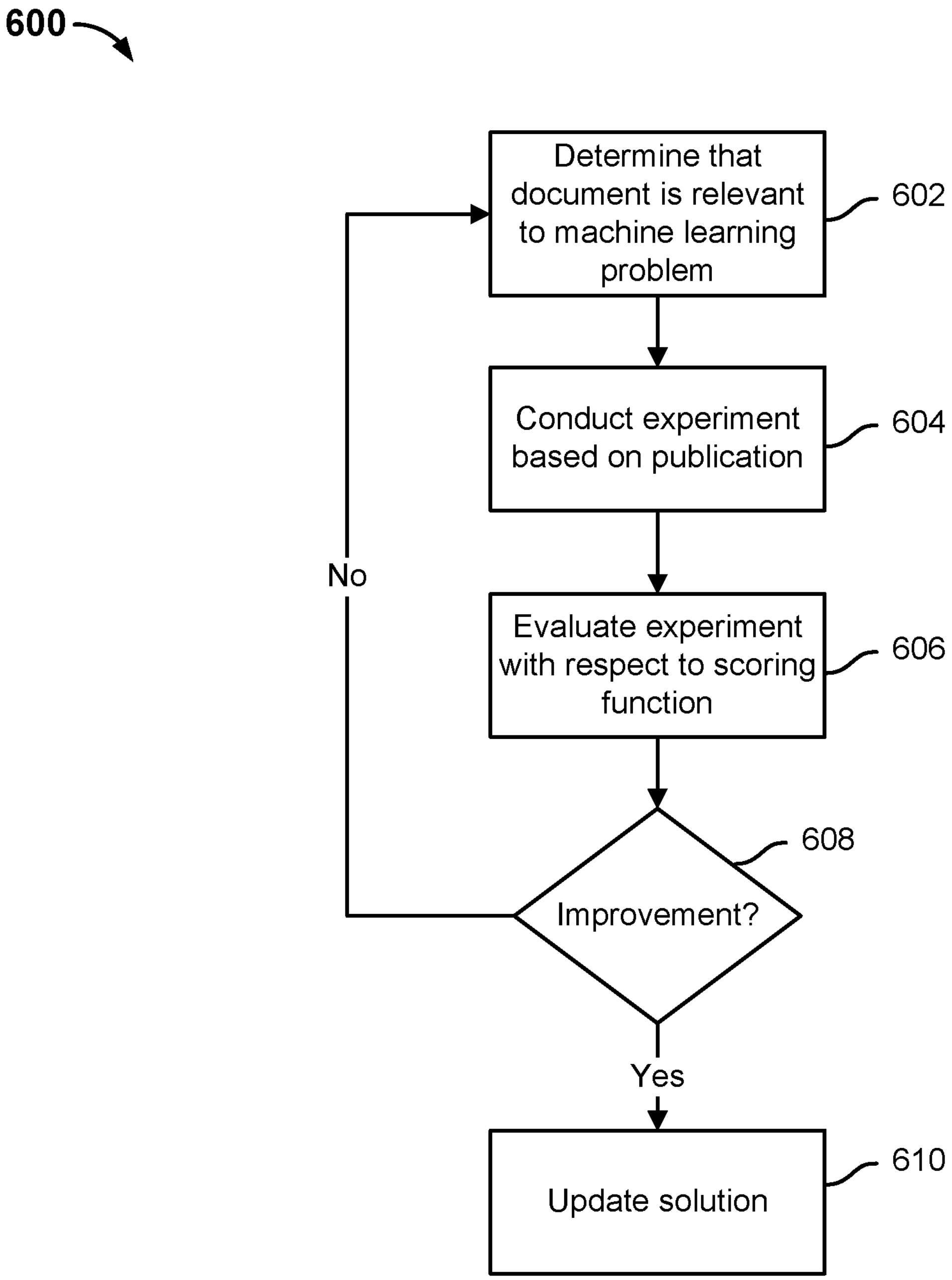
FIG. 6 is a flow diagram illustrating a process for automated experimentation and evaluation of machine learning solutions in accordance with some embodiments.

FIG. 6 is a flow diagram illustrating a process for automated experimentation and evaluation of machine learning solutions in accordance with some embodiments. In the example shown, process 600 may be implemented by a literature monitor such as literature monitor 504.

At 602, a document is determined to be relevant to a machine learning problem. A document may be determined to be related to a machine learning problem when a language model or retrieval mechanism, such as search, citation traversal, author-based expansion, embedding similarity, keyword generation, or predictive scoring, identifies the document relevant to the machine learning problem. In some embodiments, the solution is updated in a machine learning codebase related to the machine learning problem. Determining that the document is relevant may be performed by a relevance determination module such as relevance determination module 512.

The document may be obtained from a document source, such as academic preprint repositories, peer-reviewed journal databases, conference proceedings, code repositories, technical blogs or research newsletters, institutional or organizational archives, web-crawled sources or general search-indexed content, proprietary or internal document collections, etc. The document may be a publication provided by a user or a publication included in results from performing a scientific literature search. Determining that the document is relevant may include utilizing information (e.g., key contributions, code snippets, and information from associated figures) about the document extracted by an information extraction module.

In some embodiments, the document is determined to be relevant because it is provided by a user.

In some embodiments, determining that the document is relevant includes utilizing a large language model to rank the results from a scientific literature search based on a predicted evaluation with respect to a scoring function, and the ranked results are added to a queue. Ranking the candidate experiments may comprise ranking the candidate experiments based on qualities of other relevant documents. Ranking the candidate experiments may comprise creating vector embeddings of experiment descriptions and comparing embedding vector similarities.

In some embodiments, determining that the document is relevant to the machine learning codebase includes using a classification model to determine that the document is relevant to the codebase. The classification model may be trained on a plurality of documents and different document types, and their relevance to a plurality of machine learning codebases.

In some embodiments, determining that the document is relevant includes extracting key contributions from the document and prompting the large language model to determine whether the document is relevant to the machine learning problem based in part on the extracted key contributions.

In some embodiments, determining that the document is relevant to the machine learning codebase includes constructing a short textual description of the codebase, concatenating the codebase and the document, and feeding the pair into a machine learning model configured to output a relevance score.

In some embodiments, determining that the document is relevant to the machine learning codebase includes training dual encoders which map documents and aspects of the codebase to vectors in a shared embedding space, computing cosine similarity between the document vector and one or more codebase vectors, and determining whether the computed similarity exceeds a threshold.

In some embodiments, determining that the document is relevant to the machine learning codebase includes learning a concept extractor over the codebase's comments, README files, and other documents, representing each document as a distribution over those concepts, and computing a similarity score between the document's concept distribution and the codebase's concepts distribution. The document is determined to be relevant if it has a high probability mass on concepts that dominate the codebase (e.g., "RLHF," "sequence-to-sequence translation," etc.).

In some embodiments, determining that the document is relevant to the machine learning codebase includes generating or collecting questions about the codebase (e.g., "how is loss computed in the ranking head?"), letting a large language model try to answer those questions using only the document, and scoring the document based on the number of questions it can answer correctly or the confidence levels of the answers.

In some embodiments, determining that the document is relevant to the machine learning codebase includes building a citation graph among documents in a relevant document corpus, such as relevant document corpus 614 and determining if the document is relevant based on whether it is connected to other documents previously deemed relevant.

In some embodiments, once determined to be relevant, the document is added to a corpus of relevant documents, such as relevant document corpus 514. In some embodiments, only a summarized portion of the document is added to the corpus of relevant documents.

At 604, an autonomous research agent, such as autonomous research agent 516, is utilized to conduct an experiment related to the machine learning codebase based on information included in the document. The autonomous research agent may include a large language model. In some embodiments, the autonomous research agent is configured to receive the relevant document and the machine learning codebase and perform an experiment according to instructions provided in an evaluation harness associated with the codebase. In some embodiments, the autonomous research agent or a large language model is utilized to generate one or more additional experiments based on the document and the machine learning codebase.

At 606, the conducted experiment is evaluated with respect to a scoring function. Evaluating the experiment with respect to the scoring function may be performed by a scoring and evaluation module, such as scoring and evaluation module 518. In some embodiments, the scoring function includes comparing the score to a threshold that is based on performance respective to a chosen evaluation metric associated with the machine learning codebase (e.g., testing accuracy of machine learning models with respect to the dataset, cost of training and testing models with respect to available compute resources, etc.). The system may compare the score to other candidate experiments, predicted outcomes, or historical results to determine whether the conducted experiment warrants updating the solution to the machine learning problem. In some embodiments, the scoring function is implemented by a machine learning model configured to evaluate the conducted experiment and produce a corresponding score.

At 608, it is determined whether a score associated with evaluating the conducted experiment indicates that the conducted experiment improves the solution to the machine learning problem. In some embodiments, the score is above a scoring threshold. If the score indicates that the conducted experiment improves the solution to the machine learning problem, process 600 proceeds to 610. If the score does not indicate that the conducted experiment improves the solution to the machine learning problem, process 600 returns to 602 and a new document is determined to be relevant to the machine learning problem. In some embodiments, the new document is selected from a ranked queue of document obtained from a scientific literature search. In some embodiments, the new document is provided by a user.

At 610, the solution to the machine learning problem is updated based on the evaluation of the conducted experiment with respect to the scoring function. In some embodiments, updating the solution to the machine learning problem includes modifying one or more artifacts produced by the system. These artifacts may include source code, configuration files, model architectures, model parameters, or trained model weights. Updating the solution may further include saving or deploying the updated model or associated artifacts to a storage system or execution environment. In some embodiments, the machine learning codebase is updated only if the conducted experiment achieves a score exceeding the scoring threshold. In some embodiments, a scoring function for evaluating conducted experiments is updated using reinforcement learning based on outcomes of previously conducted experiments. In some embodiments, the scoring function is utilized as the objective function for improving parts of the system using reinforcement learning. For example, the system may learn which aspects of the document and/or document corpus may lead to rewards with respect to the scoring function (e.g., a model used for summarization may be updated based on the reinforcement learning rewards). Updating the machine learning codebase may include adding code related to conducting the experiment (i.e., code generated by the autonomous research agent for conducting the experiment) to the machine learning codebase or replacing code in the machine learning codebase. In some embodiments, the reinforcement learning used to improve components of the system employs reward signals other than the scoring function, such as human interactions with intermediate states of the system, human preference judgments, or alternative evaluation metrics that differ from the scoring function used to evaluate experiments. In some embodiments, a genetic algorithm is utilized to select one or more solutions to the machine learning problem.

Figure 7:
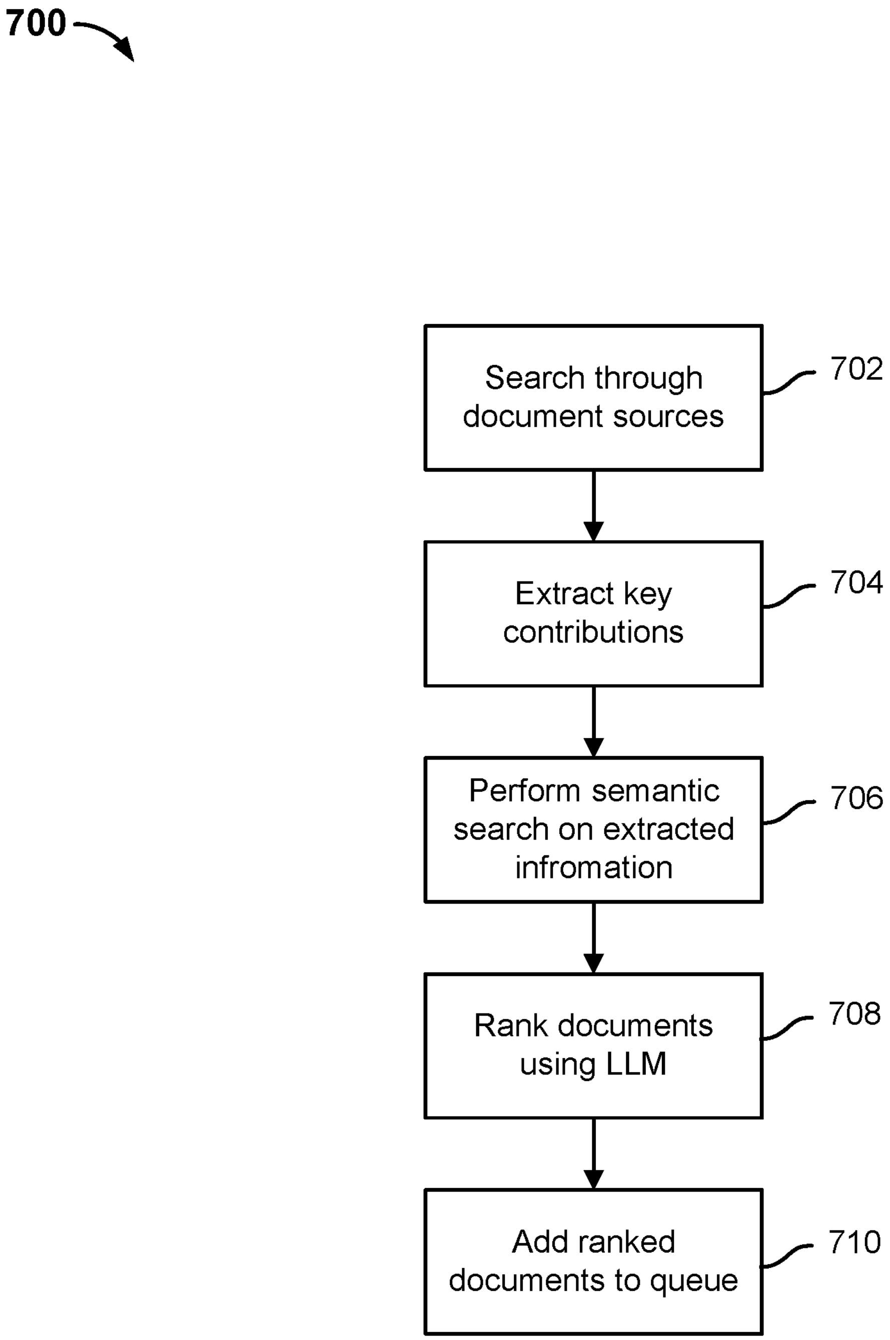
FIG. 7 is a flow diagram illustrating a process for performing a scientific literature search in accordance with some embodiments.

FIG. 7 is a flow diagram illustrating a process for performing a scientific literature search in accordance with some embodiments. In the example shown, process 700 may be implemented by a literature monitor such as literature monitor 504.

At 702, a search is performed through a plurality of document sources. The document search may be performed by a search module, such as search module 506. In some embodiments, the document search includes a web search. In some embodiments, a large language model is utilized to extract key words from a document to perform a keyword-based web search for related documents. In some embodiments, a custom database is created based on results from the document search. Performing the document search may then include performing retrieval augmented generation (RAG) or contextual hierarchical summarization techniques on the custom database to extract relevant information for specific queries.

At 704, key contributions are extracted from the document search results. The key contributions may be extracted from the search results by an information extraction module, such as information extraction module 508. Extracting the key contributions may include using AI summarization models that are prompted to generate concise summaries of documents included in the document search results. In some embodiments, extracting the key contributions includes extracting information from figures included in the document search results using vision models trained or prompted to interpret and summarize graphical data in documents. In some embodiments, extracting the key contributions includes extracting code snippets or methodology descriptions from the relevant papers to enhance reproducibility or to suggest improvements to existing projects.

At 706, a semantic search is performed on the extracted information. In some embodiments, a summary of the extracted key contributions and extracted code snippets, along with other information about the scientific literature search results, is generated. The summary may be generated by a large language model or by a summarization module such as summarization module 510. In some embodiments, the semantic search is performed based on the generated summary.

At 708, one or more documents from the document search results are ranked using a large language model. In some embodiments, ranking the documents includes making a predictive evaluation with respect to a scoring function. In some embodiments, ranking the documents comprises creating vector embeddings of experiment descriptions and comparing embedding vector similarities. In some embodiments, a calibration curve is created using predicted and actual results of the ranked documents in relation to a scoring threshold.

At 710, the one or more ranked documents are added to a ranked queue. In some embodiments, the ranked queue is implemented as a priority queue, with priority assigned to documents with the highest ranking. In some embodiments, documents are chosen for experimentation and evaluation relative to a machine learning codebase as in the order of rankings in the queue. In some embodiments, the highest ranked documents is provided to a literature monitor, such as literature monitor 504, for implementing process 700.

Maintaining the ranked queue allows a user of a system for automated experimentation and evaluation of machine learning publications, such as system 500, to continuously update a related machine learning codebase, such as machine learning codebase 502, based on state-of-the-art research and recent search results. Additionally, maintaining the queue supports the user in optimizing for computational resources (e.g., available virtual machines, graphical processing units, etc.) and only evaluate additional documents or perform additional searches once resources become available.

Appended Provisional Application (Full Text)

The following material corresponds to U.S. Provisional Application No. 63/729,820, the entirety of which is hereby incorporated by reference.

Artificial intelligence (AI) systems designed to assist or automate research scientists in the process of conducting, improving, and automating research workflows are disclosed herein. The system applies to scientific literature searches, hypothesis generation, methodology creation, peer review, and iterative refinement. It further encompasses automated suggestions for improving research workflows, code bases, and experiment designs.

The systems and methods disclosed herein address several key challenges with AI scientists performing scientific research:

Scalability: Human researchers struggle to keep pace with the rapid expansion of scientific literature. The systems and methods disclosed herein utilize an AI system to efficiently scale to process this vast amounts of information, providing timely insights and supporting research at a speed that matches the growing volume of data.

Quality of Research: By ensuring that the AI is grounded in accurate scientific literature, the systems and methods disclosed herein enhance the quality of research outputs. This allows the AI to contribute meaningfully to the generation of new hypotheses and methodologies that are well-supported by existing literature.

Efficiency in Experimentation: Automated review processes, such as AI-driven assessments, significantly improve efficiency by reducing the manual workload involved in reviewing and validating experimental methodologies. It also reduces the number of experiments run that are unlikely to yield meaningful results.

Citations Accuracy: Unlike traditional Large Language Model (LLM) approaches to automated research that add citations post-generation, the systems and methods disclosed herein include accurate citations throughout the entire research pipeline. This ensures transparency, traceability, and verifiability of the research outputs.

Ethical Compliance: Automated ethical reviews and computational resource checks help ensure that the research methodologies adhere to ethical guidelines, minimizing risks associated with autonomous experimentation.

Resource Constraints: Limited computational resources can pose challenges for executing extensive autonomous research. the systems and methods disclosed herein address this by early-on catching methodologies, solutions, or ideas whose computational loads are beyond those available to an agent.

Parallel Research Pathways: The system's ability to conduct multiple parallel research paths and assess them autonomously enables comprehensive exploration of potential solutions, leading to more robust outcomes.

Large Language Models and Agents

LLMs are AI systems trained on extensive datasets of text to understand and generate human-like language. These models, such as GPT-4 and Claude, are capable of interpreting and synthesizing vast amounts of information, making them suitable for applications in research, customer service, content creation, and more. LLMs use advanced natural language processing techniques to comprehend context, answer questions, and generate coherent and contextually relevant responses.

AI agents are systems that use LLMs as a core component to perform specific tasks autonomously. These agents are equipped with a set of rules, tools, and algorithms that allow them to perform goal-oriented actions, such as conducting experiments, generating code, or reviewing research papers. By combining LLMs with specialized capabilities like retrieval-augmented generation (RAG), vision models, and web-access, AI agents can be designed to carry out complex workflows with minimal human intervention. The integration of LLMs into AI agents enables these systems to make decisions, learn iteratively, and improve over time, making them a powerful tool for automating research and other high-level cognitive tasks.

The systems and methods disclosed herein may augment any LLM prompt to include a Scientific Literature Search Engine. This means that there will be accurate citations for every piece of knowledge created during the entire process of creating the research. In the past, a common technique for research has been to find citations that support the words generated by the LLM after the text is produced. In contrast, the system and methods disclosed herein base all generations on literature and keep those citations with the generated text throughout the entire research pipeline. This ensures that the text produced has real citations that accurately convey the sources on which the generated content is based.

Autonomous Software Engineering Agent

A Software Engineering (SWE) agent is an autonomous artificial intelligence system designed to assist with or perform various software engineering tasks. These agents leverage LLMs and specialized interfaces to interact with development environments, codebases, and tools in ways that mimic human software engineers.

Core Concept and Functionality

SWE agents are built to autonomously handle software engineering tasks, ranging from bug fixing and code generation to test creation and code review. At their core, these agents utilize advanced language models, such as GPT-4, to understand and generate human-like text and code. One important feature lies in how these agents interface with computer systems to perform real-world software engineering tasks.

Agent-Computer Interface (ACI)

A crucial component of SWE agents is the Agent-Computer Interface (ACI). This interface acts as a bridge between the language model and the computing environment, allowing the agent to:

- Browse and navigate file systems
- Create, read, edit, and delete files
- Execute code and run tests
- Interact with version control systems like Git
- Submit solutions as pull requests The ACI concept is important to enabling LLMs to operate effectively in a software development context, providing a structured way for the AI to interact with the development environment.

The present disclosure describes a comprehensive AI-powered system that assists research scientists at various stages of the research process, from literature review to experiment design and implementation. The system uses RAG techniques and other methodologies to provide contextually accurate results from scientific literature like automatically generates hypotheses, suggests novel methodologies, and automated peer review feedback. Additionally, the system can triage scientific papers, summarize them, suggest improvements for research projects, and execute code-base improvements via AI agents. Below we describe each set of innovations applied to each component of the automated agent process.

Figure 11:
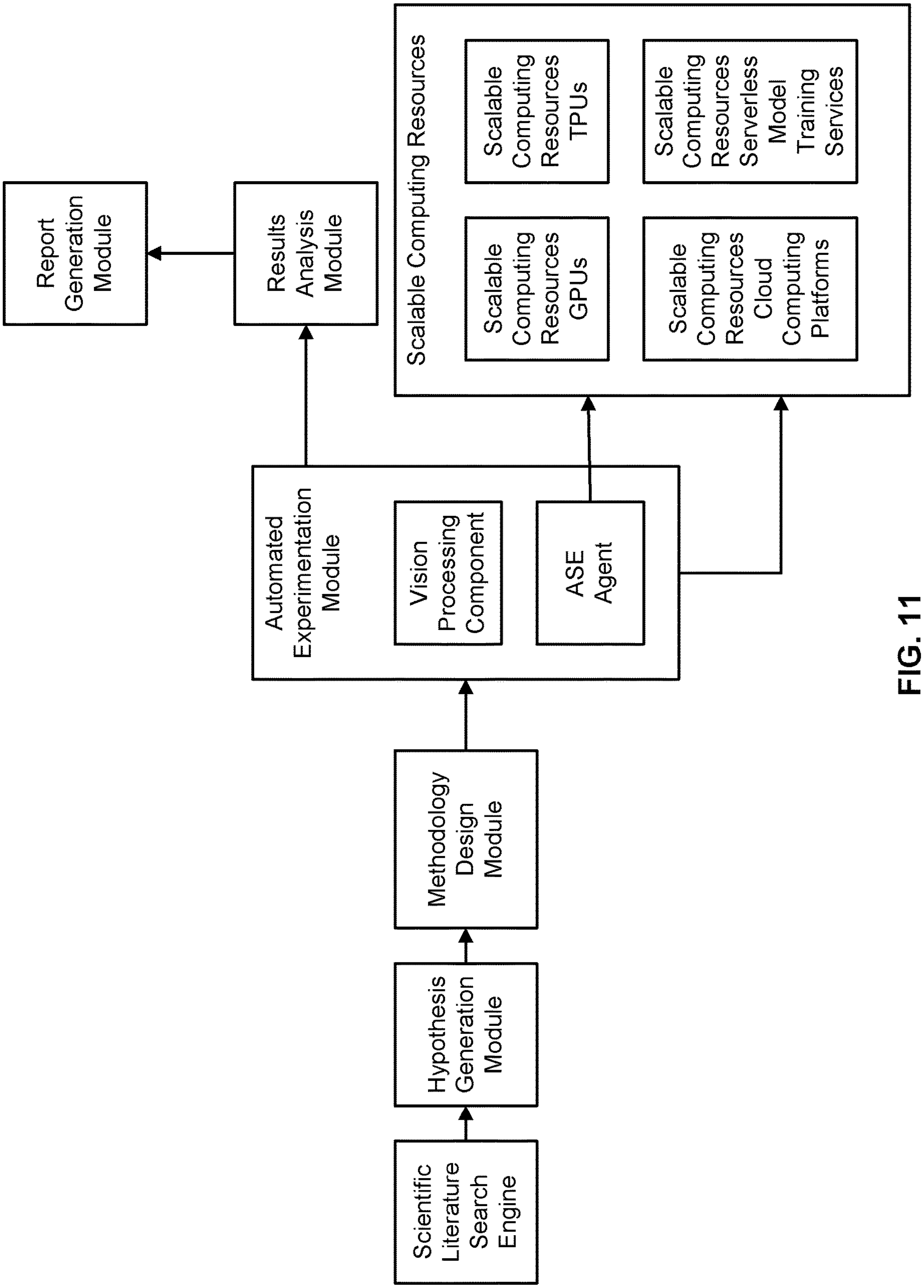
FIG. 11 is a block diagram illustrating a system for assisting or automatic scientific research in accordance with some embodiments.

The AI-powered system, as seen in FIG. 11, is capable of autonomously conducting computational research. It heavily relies on LLMs to complete each part of the research pipeline. The LLM may be a public, private, or hybrid LLM. The process involves conducting a literature review, identifying future directions of research, proposing solutions, building methodologies to test those solutions, running experiments, analyzing results, and generating research reports. The use of LLMs allows each step mentioned above to be informed by all scientific literature available. The AI-powered system possesses the remarkable ability to carry out computational research autonomously. It leverages the immense capabilities of LLMs like ChatGPT and Anthropic's Claude to seamlessly execute each phase of the research pipeline.

Literature Review

Starting with a research topic or specific paper, the system commences the research process by conducting a comprehensive literature review. It delves into scientific journals, articles, and research papers, utilizing LLMs to identify key themes, trends, and gaps in existing knowledge. This initial phase provides a solid foundation for the subsequent stages of the research.

In some embodiments, the system starts with a provided set of papers that are already deemed to be related to each other. For example, the set could include a paper with an improvement for an algorithm and another paper which uses the outdated version of the algorithm. A new version of the second paper can be written using the improvement from the first paper. In some embodiments, code samples from the repositories used by the papers are included in the set.

Identifying Future Directions

Building upon the literature review, the system employs LLMs to analyze the current state of research and identify potential future directions. It synthesizes insights from various disciplines and domains, generating innovative ideas and hypotheses that have the potential to advance scientific knowledge.

Proposing Solutions

Once promising research directions have been identified, the system harnesses the capabilities of LLMs to propose original solutions to complex problems. It draws upon a vast repository of scientific knowledge to develop novel approaches, methodologies, and algorithms. These proposed solutions serve as the foundation for the next stage of the research process.

Building Methodologies

To test the feasibility and effectiveness of the proposed solutions, the system prompts an LLM to design and develop robust methodologies. These methodologies outline the experimental setup, data collection procedures, and statistical analysis techniques required to evaluate the solutions. The methodology is informed by the existing research, taking into account existing code repositories, figures and corpus of scientific literature. The LLM is prompted to include in the methodology pseudocode, modifications to existing codebases, baselines, datasets, hyperparameters and all other details needed to exactly describe an experiment.

Running Experiments

The system meticulously executes the experiments outlined in the methodologies by leveraging ASE agents, like Devin.ai or Factory.ai to exactly implement the methodology. The automated software engineering is augmented to include a vision processing module, which uses AI vision models to view a scientific figure, chart or table and exactly describe it with text that can be processed by the ASE agents. The ASE agent is instructed to place all relevant results, including figures and a thorough technical report, in specific locations for future use.

Analyzing Results

Once the experiments are complete, the system engages an LLM and the AI vision module to analyze the vast amounts of data generated. It employs advanced statistical techniques and machine learning algorithms to extract meaningful insights, identify patterns, and draw conclusions from the experimental findings.

Generating Research Reports

The final stage of the research process involves the generation of comprehensive research reports. LLMs compile the findings from the literature review, proposed solutions, experimental methodologies, and data analysis into well-structured and informative reports. These reports serve as valuable resources for the scientific community, fostering knowledge sharing and collaboration. Depending on the use case, this report could be in the form of a scientific paper, experiment report or a format intended for use specifically by other AI models.

Figure 12:
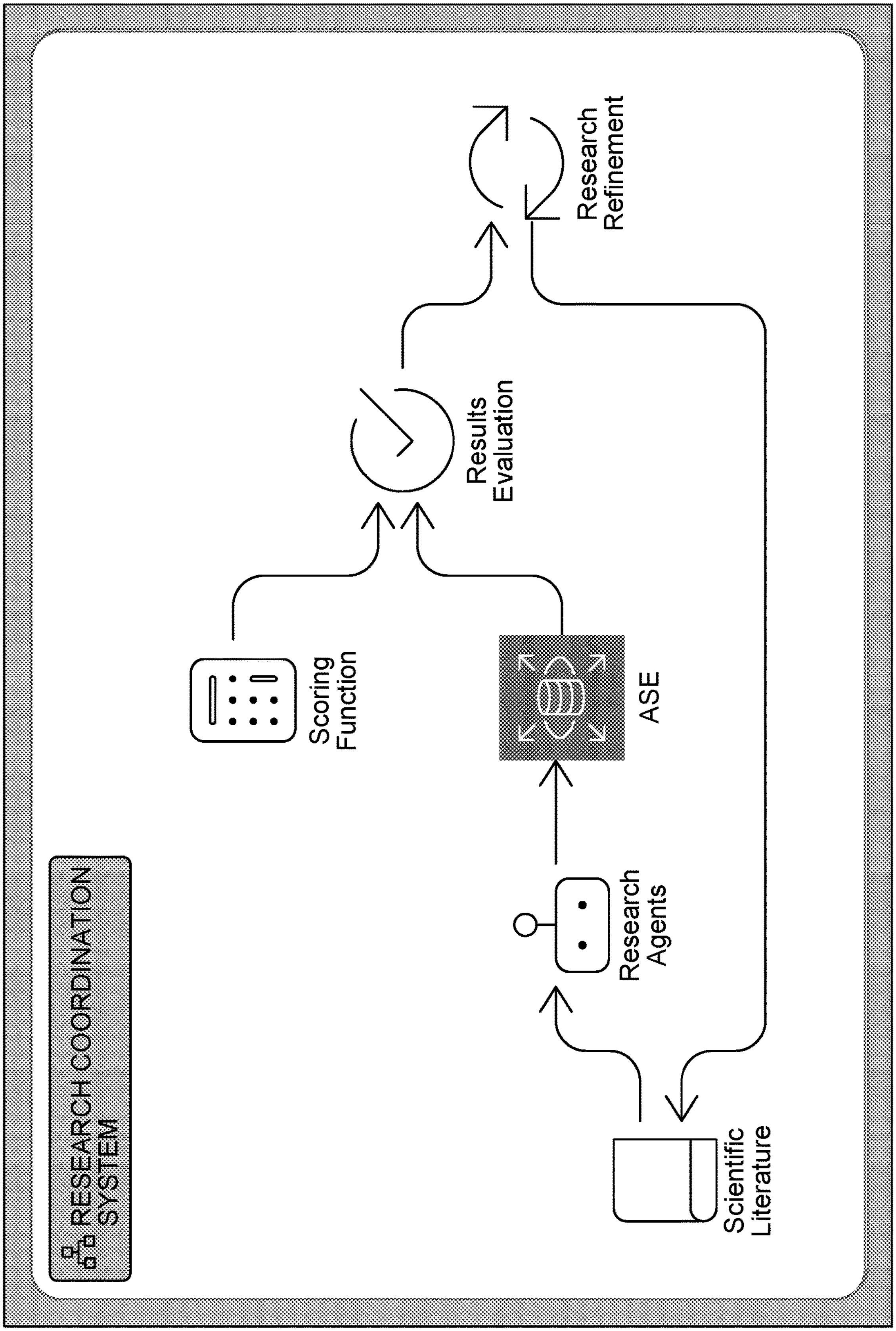
FIG. 12 is a flow diagram illustrating a process to coordinate multiple automated research agents in accordance with some embodiments.

Throughout the entire research pipeline, the integration of LLMs enables the system to make informed decisions at each step, leveraging the collective wisdom of the scientific literature. As seen in FIG. 12, each step along the way is subject to thorough refinement, review and grading. After each step and sometimes during steps, other AI models are asked to provide feedback and suggestions. If the feedback is critical enough, the experiment may be abandoned to entirely to save computational resources.

Figure 8:
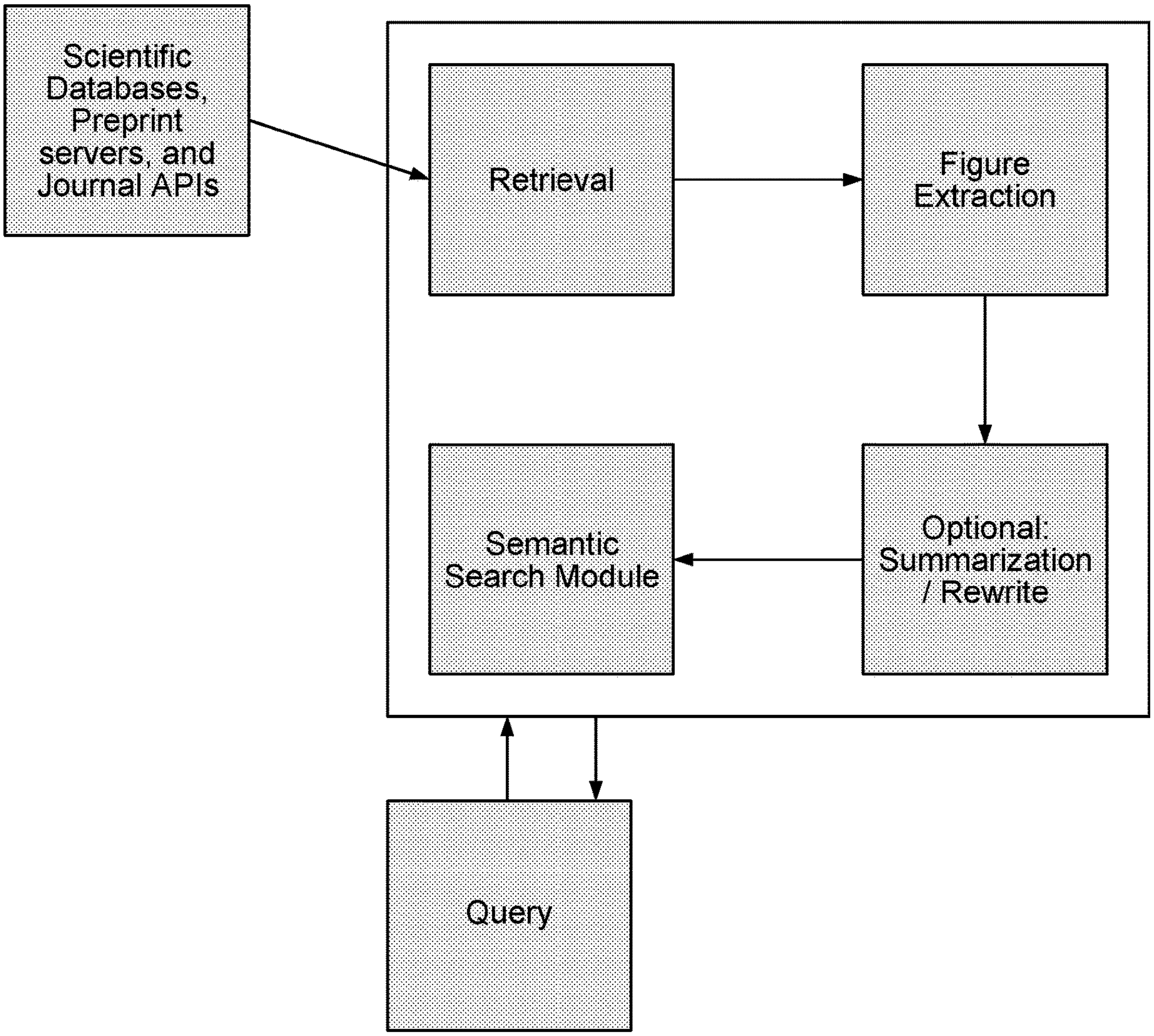
FIG. 8 is a block diagram illustrating a scientific literature search engine in accordance with some embodiments.

Some or all of these steps employ the Scientific Literature Understanding Engine, for example as shown in FIG. 8, to allow the ASE agent to reason about all scientific literature.

Dashboard for Researchers

Researchers can build and monitor experiments using the system's tools on a user-friendly dashboard. The dashboard can integrate with the researcher's documents and all existing scientific literature, providing real-time suggestions and insights based on those documents.

Literature Monitoring

Figure 10:
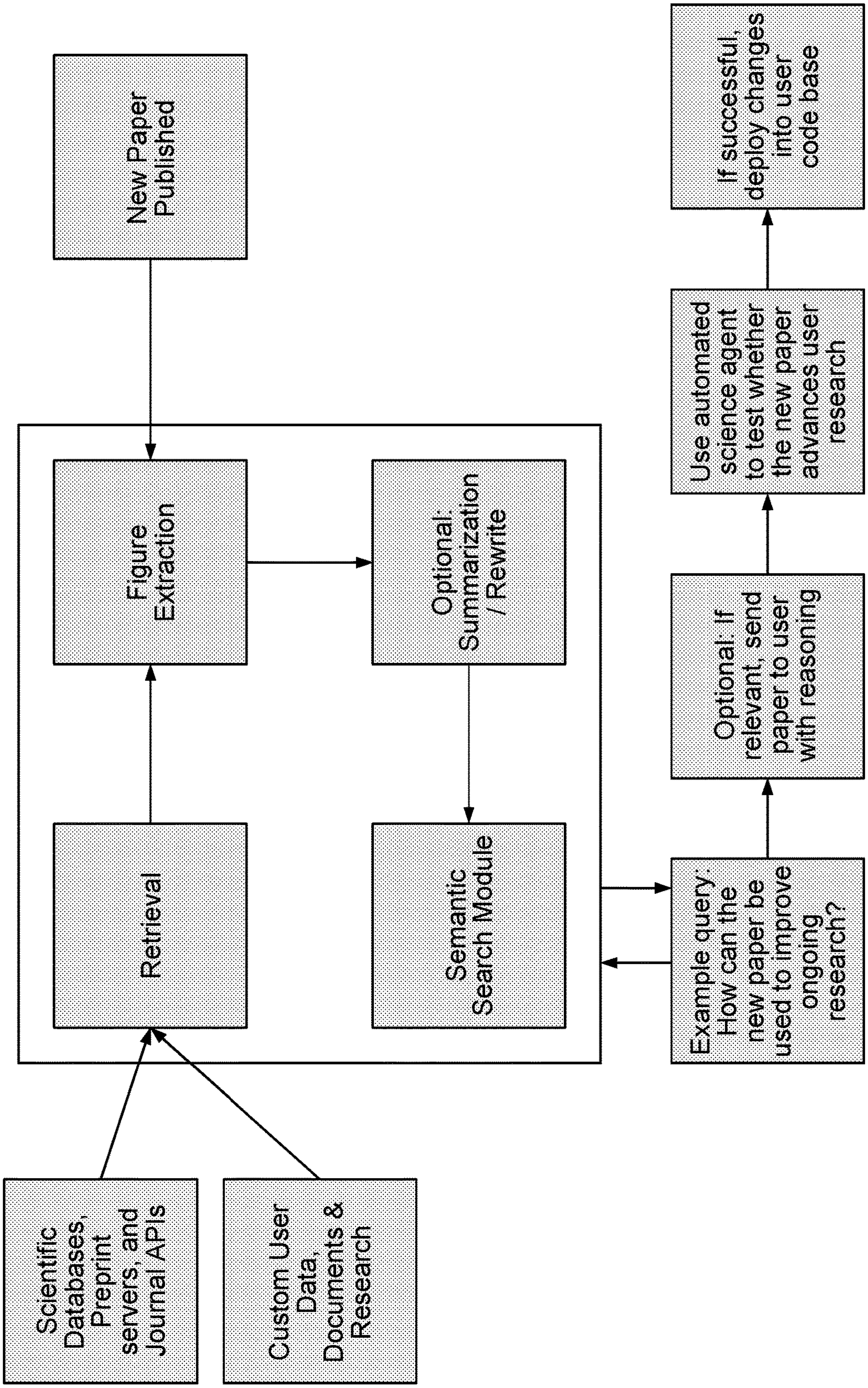
FIG. 10 is a block diagram illustrating a literature monitoring module in accordance with some embodiments.

The system, as seen in FIG. 10, may continuously monitor publications for research relevant to a researcher's ongoing work. When a relevant paper is identified, the system analyzes it and provides a summary of its findings, highlighting its potential impact on the researcher's research. The system can also automatically conduct experiments based on that literature.

Peer Review Implementation

Conferences, companies and publications can utilize the ASE agent to verify the reproducibility of submitted papers. The ASE agent can automatically run experiments outlined in the paper, ensuring the validity and reliability of the research findings.

Optimized Autonomous Research

In some embodiments, an autonomous research agent is implemented to direct fully autonomous research targeted toward a specific goal specified by a scoring function. Rather than conducting research with the goal of creating new knowledge, research is conducted with the goal of optimizing a specific scoring function. One example of the scoring function might be the accuracy of a machine learning model of a specific dataset. The scoring function may be used to provide direct feedback to the research process about the quality of the conducted research.

This can be implemented using a naive method that 1) uses the autonomous research agent with any existing baseline method as one of the key starting documents in the process 2) allow the autonomous research agent to conduct an experiment for an improvement to baseline or new method 3) evaluate the autonomous research agent's research on the scoring function 4) if the scoring function produces a higher score, update the baseline to use the improved method.

A more advanced implementation might use a method similar to DeepMind's FunSearch to track multiple lines of research at the same time. FunSearch is a new form of code search which uses language models to propose and improve new solutions to specific computational problems that have scoring functions which can verify each proposed solution's efficacy. The scoring function is used to reject and resample different solutions. Replacing their LLM which writes code with our research agent would allow our agent to autonomously conduct research that builds on its own work, automatically accepting and rejecting its own research using the scoring function.

The autonomous research agent may use scoring functions to accept and reject its research across multiple experiments. With this method, the system is able to in parallel execute an arbitrary number of parallel agents running different experiments in order to achieve a specific research goal. Without this, the research executed by the agents has to be reviewed by a human or automated AI peer review in order to assess its value, a burdensome process that has difficulty comparing work between agents.

Scientific Literature Search Engine

The system utilizes a variety of methods to build scientific literature searches RAG or other advanced AI methodologies to conduct comprehensive searches across all scientific literature. It applies contextual hierarchical summarization techniques to extract relevant information for specific queries. The process involves:

Searching through databases of scientific literature to identify relevant papers.

Extracting key contributions from each paper using AI summarization models that are prompted to generate concise summaries.

Extracting information from figures using vision models trained or prompted to interpret and summarize graphical data in scientific papers.

Optionally, extracting code snippets or methodology descriptions if included in the paper to enhance reproducibility or to suggest improvements to existing projects.

A semantic search is applied over this extracted information to extract the most relevant sources. Alternative embodiments don't use a RAG semantic search, but instead directly use LLMs to assess the value of each document to the search query. While slower, this produces higher quality results. In some embodiments, a combination of the approaches is used, where RAG is used to find candidate papers from our custom dataset, then an LLM is used to narrow down and rank the candidate papers. In some embodiments, the papers are provided directly as an output while in other embodiments, an answer to a question is given as a response.

In some embodiments, embedding models, like Word2Vec, are used to build sparse embeddings for each document and compare the sparse embeddings of the query with the sparse embeddings of the document. After the top results have been found, more dense embeddings of the query and each document are then compared. More dense embeddings are continued to be progressively compared and trimmed until a small number of documents is reached (e.g., less than a threshold number of documents). From there, the documents may be directly added to the context or provide the document to an LLM for processing.

In some embodiments, each query and document is provided into the context of a language model and the model is asked to identify whether the document is relevant to answering the query. This operation can be completed in parallel for each document. In addition, the document may be prepended to the prompt. That is, the document is first provided to the LLM and then provide the query in the prompt. This structure allows the system to cache the key-value attention activations of each document, meaningfully decreasing the computational requirements of this search. If the language model finds that the document is relevant through prompting, then either the entire paper or an LLM generated summary of the relevant portions can be added to a list of relevant text. The relevant text can then be used in a more limited RAG search to answer the query. Providing the entire paper ensures that the model has the context of the entire paper when the LLM is answering the query. This method provides the most accuracy at the highest computational cost of any of the methods. It's best used for queries where extracting as much information from the corpus is desired and latency is not an issue. Providing a portion of a document may not provide the most accurate answer since the omitted portion(s) of the document may include relevant information that will be unavailable to the LLM.

A custom corpus of the literature designed may be created for easier accessibility by the research agents compared to existing scientific papers. Part of the process may involve entirely rewriting each scientific paper into a more condensed format (e.g., JSON) or into a format which includes more information from its references. For example, across the corpus of all scientific literature, there's a meaningful amount of duplication of information. Some implementations may create new versions of scientific documents specifically to avoid duplication of information between other documents. Some documents may be rewritten using LLMs many times with a specific focus on application areas or in response to the query asked by the user. The LLM may be prompted with a particular schema. The corpus may also be reorganized into a knowledge graph.

Some implementations May 1) Ask a series of questions to each scientific paper such as "what are the main contributions" or "what are the novel methodologies applied". 2) Add the response to each question as a new document in the corpus. 3) Apply one of the search methods described above.

In some embodiments, mathematical symbols are parsed using a parsing module into a typesetting system (e.g., LaTex) that is understood by the LLM.

When generating a response to a query, the agents are prompted to include special tokens that indicate when a piece of text should have a citation to one of the provided pieces of literature. These tokens help in ensuring that the generated responses are well grounded in the scientific literature. As the response evolves through iterative refinement, these citations are continuously tracked and updated. This results in final responses that are not only accurate but also transparently linked to their source materials, making the generated content more reliable and verifiable.

Hierarchical Answer Building for Queries

The system can build an answer to a query in a hierarchical and iterative manner by analyzing all documents in the corpus step by step. The process involves the following steps:

Initial Query Analysis: The system begins by analyzing the query to determine its scope and the key concepts involved. It uses an LLM to break down the query into subcomponents that will guide the subsequent search and answer-building process.

Iterative Document Analysis: The system then starts iterating over each document in the corpus. For each document, it extracts relevant information that pertains to the query. The LLM is used to evaluate how the new information relates to the current working answer.

Updating the Working Answer: After reviewing each document, the system updates its working answer to the query. This update involves synthesizing newly gathered information with the existing working answer to ensure that the most accurate and comprehensive response is maintained.

Hierarchical Summarization: The system applies hierarchical summarization techniques to organize the information gathered from multiple documents. By creating intermediate summaries at different levels of detail, the system can effectively manage the complexity of the information and ensure that the final answer is well-structured.

Final Answer Generation: Once all documents have been reviewed, the system compiles the final answer. This answer is a synthesis of all the insights gathered throughout the iterative review process. It is refined for clarity and completeness before being presented as the final response to the user.

This approach allows the system to progressively refine its understanding of the query and build a more accurate and contextually rich answer by leveraging the entirety of the available literature.

Automated Hypothesis Creation

The system can autonomously generate research hypotheses by reading and analyzing published papers. The hypothesis generation process involves:

Identifying limitations or future research directions from a specific research paper, combination of research papers or codebase.

Drawing connections between multiple papers to identify novel hypotheses that build upon or challenge existing findings.

The system can also automatically evaluate hypotheses for novelty using the scientific literature search model.

These steps are executed with LLM prompting combined with the scientific literature search module to allow the responses to be well grounded in existing literature.

To create a system that can autonomously generate hypotheses by reading and analyzing research papers, a series of LLM-driven prompts combined with a scientific literature search module are used. For example, the Scientific Literature Search Engine may be used to identify relevant information from the literature about the paper. That information may be added to the prompt, and the LLM may be instructed to do one of the following:

Example Prompt 1: "Read the abstract, introduction, and conclusion of this paper and list any limitations or suggestions for future research provided by the authors."

Example Prompt 2: "Summarize any challenges, open questions, or areas for further investigation mentioned in the discussion or conclusion sections of this paper." These are example prompts that describe the may change for the exact implementation.

Automated Methodology Creation

The system suggests new research methodologies by building on generated hypotheses or refining existing ones. Provided as input to the LLM prompt includes all related scientific literature that's been previously identified during the ideation and solution generating processing. The input may also include other scientific literature that's deemed to be relevant by the Scientific Literature Search Engine. An LLM is then prompted to generate a methodology to test whether the proposed solution actually solves the identified problem or future direction. The prompt may include instructions to:

Generate step-by-step methodologies for conducting experiments or testing hypotheses.

Include every detail needed by the ASE to completely execute the experiment.

Figure 9:
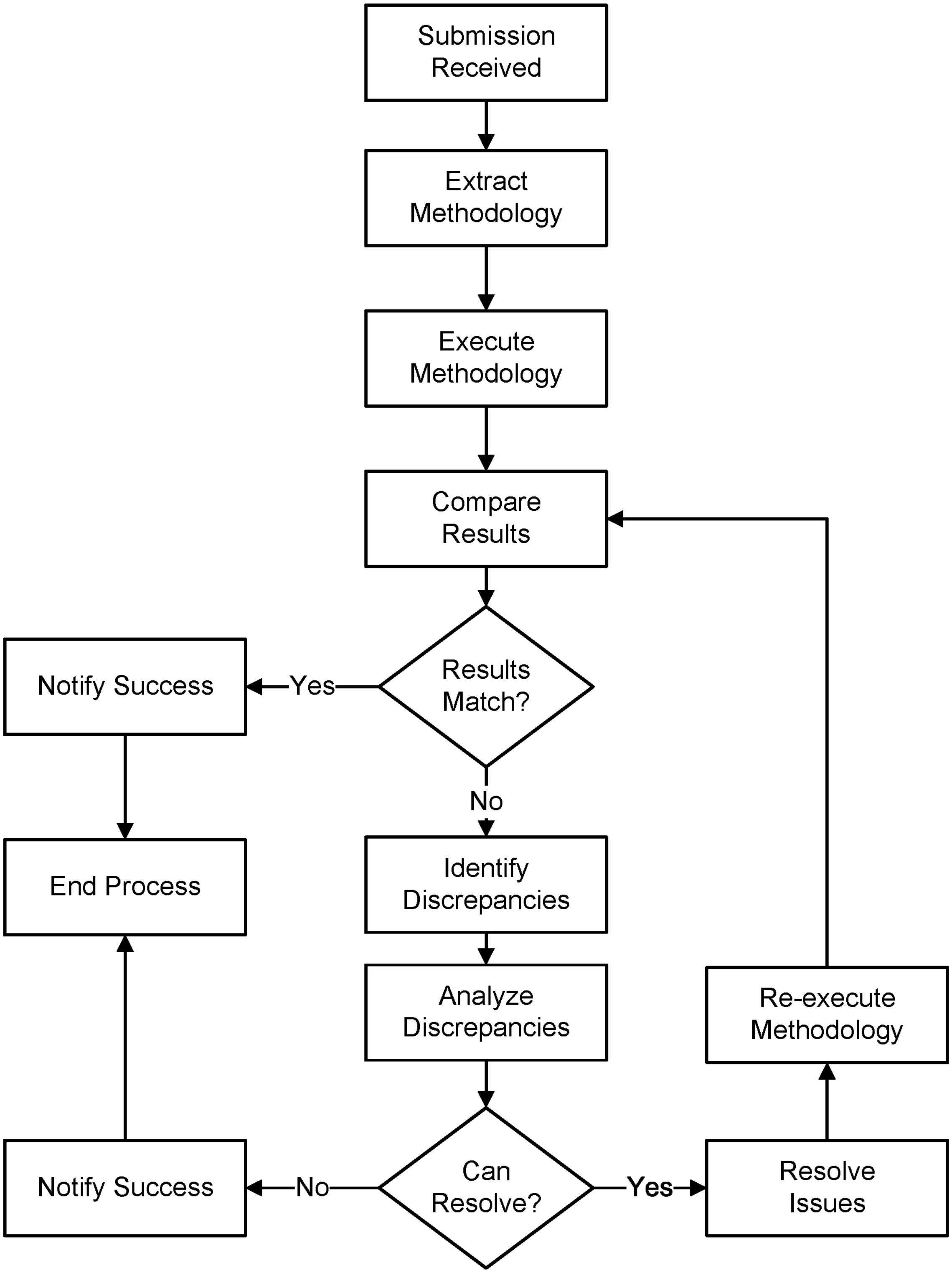
FIG. 9 is a flow diagram illustrating a process to perform automated peer review in accordance with some embodiments.

This method, as seen in FIG. 9, may also use iterative refinement, where methodologies are proposed, evaluated, and improved before being sent to the ASE.

Code Collection

To accelerate the process of writing code, a tool which allows the language model to download, view and reference code repositories from specific papers is included in the system. Many papers publish links to their repositories (either in databases, or parsable in the paper). Those repositories may be downloaded to allow the LLM to reason over them during the creation of the methodologies. Starting with this code eases the task of the ASE and allows for recreations of existing baseline algorithms without requiring implementation.

Automated Ethical and Safety Review

Before shipping the methodology to the ASE for execution, the system may review the methodology, idea, or any previous generations to determine whether the proposed experiment follows a set of ethical and safety guidelines. The safety and ethical review can be done by humans or autonomously by an LLM model specialized in providing feedback for these methodologies. If the methodology fails to meet ethical or safety guidelines, the system may send it back to the Automated Methodology section for further refinement or reject it outright.

Automated Computational Resource Review

To allow for computational expensive experiments, an ASE may be augmented so that it has access to accelerated computing hardware, like GPUs or TPUs. However, exactly how much computational resources to provide to the agent can be challenging to determine in advance. As a result, the ASE may be allowed to increase the amount of accelerated computing hardware it has access to by providing it access to a tool that achieves this goal. The tool, when called by the ASE, freezes the disk and RAM of the ASE and redeploys it a new machine with the technical specifications outlined in the parameters of the tool call. Alternatively, the model may be given access to a cloud compute platform so that it can deploy its code on machine specifications of its choice. Alternatively, the ASE credentials and sample code may be offered for serverless model training services, which allow their users to build computation graphs which describe their experiments then send them to a service which finds the best computing resources available for the task.

Given one of these computing paradigms, the system may still generate methodologies that are executed with the resource constraints. To address this challenge the system also reviews the methodology to determine whether the experiment will exceed the computation resources allocated for the ASE. It does so by prompting an LLM to estimate the computation cost of the methodology. If the methodology breaks computational requirements, it is sent back to the Automated Methodology section for refinement or rejected outright. This early-on evaluation helps prevent the waste of computational resources and ensures that the proposed methodologies are feasible within the available constraints.

Integration with Research Scientist's Internal Knowledge

The system enhances the relevance of its suggestions by integrating information from:

Internal memos, design documents, emails, and other communications specific to the user's research institution.

Source code repositories, enabling AI-driven identification of gaps in the code that can be filled by relevant findings from recent literature.

Providing real-time notifications of new relevant papers as they are published.

Automated Experimentation Execution

The system integrates with SWE agents to execute suggested improvements or methodologies. It works as follows:

Once a methodology has been generated, approved by the user, or auto-approved, the SWE agent is instructed to implement the change in the provided code-base or to write a new code base to execute the methodology.

The SWE agent can ask clarifying questions if necessary.

The AI logs the implementation steps for reference in future iterations of the research project.

After the agent completes its task, it provides code, graphs, logs and technical reports for the downstream task of analyzing the results.

Generalization to Non-Scientific Literature

The system is designed to be generalizable to other types of literature beyond scientific research. This includes:

Searching and summarizing information from non-scientific sources like Wikipedia, blogs, or internet forums.

Applying the same techniques of hypothesis generation, methodology suggestion, and paper triage to a broader scope of literature.

Iterative Refinement

All the functionalities in this invention can be further improved through iterative refinement. With this well-established method, one LLM is used to critique the output of LLM. The critique is generated by prompting a model to generate feedback to a specific response. The original response and critique is then provided to another LLM which applies the criticism to the model. This can be implemented with basic prompt chaining methods. Other implementations could use ranking, consensus, or voting systems. Most implementations will also use the scientific literature search engine to ground the criticisms of the critiquing models in the scientific literature (or other documents available).

Citation Accuracy Checker

The system can build an accuracy checker module for the written results by prompting an LLM to identify, for each sentence or paragraph, where in the provided citations that information comes from. The process involves providing the LLM with the sentence or paragraph being fact-checked along with the citations included in the section. In practice, citations may be included to any technical reports, logs, and figures in the write-up of our results. The relevant documents from these sections are pulled in as well.

If the LLM is unable to find the relevant sections in the citations, those paragraphs are flagged as potentially hallucinated. Depending on the severity, hallucinated sentences can either be removed or regenerated to ensure accuracy and alignment with the provided sources. In practice, it's likely the citation accuracy module would be applied for each sentence.

Scoring Based Evaluations

Some implementations may use scoring functions in order to guide and rank the research being completed by multiple automated research scientists working on a single problem.

For example, suppose the automated research agent is building models that excel at identifying images of cats. A scoring function may accept a trained model and evaluate the model against a fixed dataset of images with labels indicating whether they include cats. The score might indicate the percent of images correctly classified. The scoring function remains the same for all experiments conducted by the automated research agent and is likely specified in advance of the execution of the automated research agent.

This score-led research workflow can be implemented using a naive method that 1) uses the autonomous research agent with any existing baseline method as one of the key starting documents in the process 2) allow the research agent to conduct an experiment for an improvement to baseline or new method 3) evaluate the agent's research on the scoring function 4) if the scoring function produces a higher score, update the baseline to use the improved method.

A more advanced implementation might use a method similar to DeepMind's FunSearch to track multiple lines of research at the same time. FunSearch is a new code generation technique which uses language models to propose and improve new solutions to specific computational problems that have scoring functions which can verify each proposed solution's efficacy. The scoring function is used to reject and resample different solutions. Replacing their LLM which writes code with the described autonomous research agent allows for much more complex proposed solutions to problems that have validation metrics (that is, score functions). It also enables the agents to autonomously conduct research that builds on its own work, automatically accepting and rejecting its own research using the scoring function. Generated research that improves the benchmark can be cycled back into the corpus of literature to allow future runs of the agent to continue to build on and improve on that method. Some implementations may explicitly prompt the system to improve methods that performed well.

In some embodiments, the autonomous research agents use scoring functions to accept and reject its research across multiple experiments. With this method, the system is able to in parallel execute an arbitrary number of parallel agents running different experiments in order to achieve a specific research goal. Without this, the research executed by the agents has to be reviewed by a human or automated AI peer review in order to assess its value, a burdensome process that has difficulty comparing work between agents.

It's worth noting that any system of automated AI peer review is itself a form of scoring function. One can view peer review as a form of providing feedback on an arbitrary experiment, where promising results are used to drive future research directions.

Parallelism

The system can generate multiple possible solutions, methodologies, literature reviews, or any other call to the LLM and pursue each as a potential research direction. Using automated peer review or a scoring function those research paths can be assessed for success.

Specialized Implementations

Paper Triage for Research Institutions

The system provides an automated triage mechanism for suggesting readings relevant to specific research needs. It uses the Scientific Research Search Module to process papers as they are published. Each published paper is compared with a corpus of ongoing research documents or code provided by the user. If the LLM creates ideas for how to use the paper to improve the user's ongoing research, then the ideas and the paper can be provided to the user. The process includes:

Identifying key papers based on relevance (from all existing papers or by monitoring new publications) to the user's field or ongoing projects using the scientific literature search engines.

Providing automated summaries and highlights for triaged papers.

Offering suggestions for improving research methodologies or incorporating new findings into existing projects using the modified research. The system can use an LLM to produce these suggestions based on the provided literature.

Code-base improvements: It analyzes current code implementations used in research projects and proposes enhancements based on recent literature.

Each suggestion is accompanied by citations from the scientific literature to support its validity, enabling transparency and traceability in the recommendation process.

AI-Powered Peer Review

The system can be fine-tuned to perform AI-driven peer reviews of research papers:

By training an LLM on historical peer reviews from conferences and journals, the LLM can generate first-round AI peer review comments for a provided scientific paper.

During the training process, these comments can be augmented to include information derived from scientific literature that's related or cited in the under-review paper. Including these comments allows for better results that are grounded in literature.

This can be used as a tool for journals or conferences to provide preliminary feedback to authors, helping them improve the quality of their submissions.

It can also be used by researchers to preemptively assess their own work.

Supervised AI-Powered Feedback:

The Score Based Evaluation methods and AI-powered Peer Review can be combined to improve overall performance. The AI-powered peer reviewer or other scoring function may be used to assign rewards to individual components of the research process. This granular reward system allows for the application of reinforcement learning (RL) techniques or the creation of reward models to optimize the performance of the underlying models generating the research components. Specifically, the scoring function can be used to assign rewards to:

Ideas and Hypotheses: Novel and promising ideas that align with the research goal, as measured by the scoring function, receive higher rewards.

Methodologies: Methodologies that lead to significant improvements in the scoring function are rewarded more heavily.

Intermediate Steps: Key steps within the research process, such as data preprocessing, model selection, intermediate text or data generated by AI models, summaries of technical reports or figures.

These rewards can then be used in two primary ways:

Reinforcement Learning: The rewards are used to train the models generating the ideas, methodologies, and other research components through reinforcement learning. This iterative process allows the models to learn which actions (e.g., generating a specific type of hypothesis or choosing a particular experimental design) are most likely to lead to higher scores, thus optimizing the research process over time.

Reward Models: The rewards are used to train separate reward models that learn to predict the potential score of a proposed idea, methodology, or intermediate step. These reward models can then be used to guide the research process by prioritizing the most promising directions and pruning less effective paths, even before full experiments are conducted. This can significantly improve the efficiency of the overall research effort.

This approach allows for a more targeted and efficient optimization of the research process, going beyond simply evaluating the final outcome and instead learning to improve each step along the way. This granular reward system, combined with reinforcement learning or reward models, enables the autonomous research agents to become increasingly effective at achieving the specified research goal.

Data Generation: Data to train these models can be collected in two ways. 1) take existing models which have passed peer review and use LLMs to extract intermediate parts of their research process (i.e. hypothesis, experiment results etc.) then use the historical peer review feedback as the assigned reward. 2) attach the final score achieved by a scoring function to the idea or intermediate step that created that workflow.

For example, if an idea to improve a model that classifies cat images is "double the number of model parameters" and the overall score assigned to the research after completion is lower than previous results, then a negative reward can be assigned to the idea. The negative reward can be used with reinforcement learning to update the weights of the AI model that produced the idea or to better train a reward model which evaluates the quality of ideas in the context of their research.

Interactive Research Environment

The system features a chat-based interface which acts as a one-stop location for all research scientist's experiments. Modern researchers face significant challenges in organizing their work. The vast amount of code, internal memos, related research, notes, logs, ideas, and experiment tracking often leads to inefficiencies and difficulties in maintaining coherence across the research lifecycle. The system can be implemented as an interactive workspace, addressing these issues by providing a centralized environment to store their work. Since their work is all accessible, other parts of the automated research pipeline can be added to streamline their work. This can allow researchers to:

Discuss ideas with the AI system, which can provide real-time feedback by pulling in relevant scientific literature and prior research.

Access suggestions and augmentations to their ideas based on recent developments in the field.

Enable ideation by drawing connections between the user's work and emerging trends in the scientific community.

Document Management: Bringing together research papers, internal notes, and code.

Literature Review: Identifying relevant papers and facilitating discussion with the user about their content and potential implications.

Experiment Design & Execution: Suggesting methodologies, generating code, and interfacing with platforms like Emerald Cloud Labs for automated experiments.

Results Analysis & Documentation: Automatically compiling results sections and dynamically updating the paper as the research progresses.

Publication Support: Ensuring proper citation, verifying claims, and offering feedback on the paper's content and structure.

Citation Suggestions: Finding locations in the private corpus that include information which should be cited in the researcher's work. This can be implemented with simple prompting that incorporates the researcher's work with the context of scientific literature.

Grant Application Assistance: Leveraging the knowledge base to identify funding sources relevant to the researcher's work and generate high-quality grant applications that effectively frame the research and highlight its potential impact.

The system can be slightly modified to allow assistance with grant applications. It can:

Generate Grant Applications: Using the scientific literature search engine, the software can generate high-quality grant applications by identifying relevant papers, methodologies, and research outcomes that highlight the research's potential impact. This involves prompting the LLM to identify key components of the research, such as its novelty, significance, and potential applications, and generate a compelling narrative around these aspects.

Technical Integration: The grant application process is supported by integrating the existing document management system, allowing the LLM to pull information from internal notes, previous research proposals, and relevant documentation. This ensures that the generated content is comprehensive and personalized to the researcher's needs.

Identify Funding Sources: The software can also leverage databases and existing funding opportunities to identify potential sources of funding that align with the researcher's field of study and focus areas. By combining information retrieval and LLM capabilities, it helps in effectively aligning research goals with funding requirements.

Grant Review and Refinement: The system uses an iterative review process, where an LLM reviews the generated application, suggesting improvements and identifying any potential gaps. This iterative review ensures that the application is polished and meets high-quality standards.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

utilizing a large language model to generate one or more new ideas, wherein the new ideas represent intermediate states of a process, including by:

obtaining an initial set of documents and one or more other documents related to the initial set of documents;

generating summaries of the initial set of documents and the one or more other documents, the summaries comprising fewer tokens than corresponding source documents and being provided to the large language model based on a context window size of the large language model; and providing the summaries of the initial set of documents and the one or more other documents to the large language model to generate the one or more new ideas based on the provided documents, wherein providing the summaries instead of the corresponding source documents increases an amount of information processable within the context window of the large language model;

executing, using an artificial intelligence (AI) agent, the intermediate states of the new ideas;

utilizing the large language model to iteratively validate code and figures generated by executing the intermediate states of the new ideas: including:

analyzing the generated code to identify errors and inconsistencies;

evaluating the generated figures for correctness relative to corresponding experimental results;

determining whether the results satisfy one or more predefined validation criteria; and upon determining that the predefined validation criteria are not satisfied, generating feedback for modifying the code and repeating execution of the intermediate states using the feedback; and generating, using the large language model, a technical report based on the validated results.

2. The method of claim 1, wherein validating results of executing the intermediate states of the new ideas includes assessing the results based on scientific robustness.

3. The method of claim 1, further comprising utilizing the large language model to generate a research paper based on the technical report.

4. The method of claim 3, wherein a length of the technical report is limited to a number of tokens comprising a size of a context window of the large language model utilized to generate the research paper.

5. The method of claim 1, wherein obtaining one or more other documents related to the initial set of documents includes utilizing a search engine to obtain the one or more other documents.

6. The method of claim 1, wherein generating the one or more new ideas further includes performing a web search to retrieve one or more relevant documents based on content and domain of the initial set of documents.

7. The method of claim 1, wherein the one or more other documents related to initial set of documents are cited by at least one of the initial set of documents.

8. The method of claim 1, wherein generating the technical report based on the validated results includes determining that two or more ideas are validated and selecting a best idea from the two or more validated ideas.

9. The method of claim 8, wherein selecting the best idea includes prompting a large language model to compare the two or more validated ideas based on predefined criteria.

10. The method of claim 9, wherein the predefined criteria include novelty of the idea and access to computational resources needed to generate the technical report.

11. The method of claim 1, wherein executing the intermediate states of the new ideas includes:

extracting methodologies based on the ideas; and generating the code related to a solution to a technical problem and the figures according to the methodologies.

12. The method of claim 11, further comprising:

upon determining that the results of executing the intermediate states of the new ideas are not validated:

inputting the generated code related to the solution to the technical problem and figures into the large language model;

prompting the large language model to generate feedback of the generated code; and repeating executing the intermediate states of the new ideas using the feedback.

13. The method of claim 1, further comprising generating a research proposal based on the technical report, wherein the research proposal includes potential datasets to be used, experiments to be run, models to be chosen for running experiments, figures to be generated, background information related to the validated idea, and sample code.

14. The method of claim 13, further comprising providing the research proposal to the AI agent as input for executing the intermediate states of the new ideas.

15. A system, comprising:

a processor configured to:

utilize a large language model to generate one or more new ideas, wherein the new ideas represent intermediate states of a process, including by:

obtaining an initial set of documents and one or more other documents related to the initial set of documents;

generate summaries of the initial set of documents and the one or more other documents, the summaries comprising fewer tokens than corresponding source documents and being provided to the large language model based on a context window size of the large language model, wherein generating the summaries compresses information from the corresponding source documents to reduce token utilization and enable inclusion of information from a greater number of documents within the context window of the large language model; and providing the summaries of the initial set of documents and the one or more other documents to the large language model to generate the one or more new ideas based on the provided documents, wherein providing the summaries instead of the corresponding source documents increases an amount of information processable within the context window of the large language model;

execute, using an artificial intelligence (AI) agent, the intermediate states of the new ideas;

utilize the large language model to iteratively validate code and figures generated by executing the intermediate states of the new ideas: including:

analyzing the generated code to identify errors and inconsistencies;

evaluating the generated figures for correctness relative to corresponding experimental results;

determining whether the results satisfy one or more predefined validation criteria; and upon determining that the predefined validation criteria are not satisfied, generating feedback for modifying the code and repeating execution of the intermediate states using the feedback; and generate, using the large language model, a technical report based on the validated results; and a memory coupled to the processor and configured to provide the processor with instructions.

16. The system of claim 15, wherein the processor is further configured to utilize a large language model to generate a research paper based on the technical report.

17. A computer program product embodied in a non-transitory computer readable medium and comprising computer instructions for:

utilizing a large language model to generate one or more new ideas, wherein the new ideas represent intermediate states of a process, including by:

obtaining an initial set of documents and one or more other documents related to the initial set of documents;

generating summaries of the initial set of documents and the one or more other documents, the summaries comprising fewer tokens than corresponding source documents and being provided to the large language model based on a context window size of the large language model, wherein generating the summaries compresses information from the corresponding source documents to reduce token utilization and enable inclusion of information from a greater number of documents within the context window of the large language model; and providing the summaries of the initial set of documents and the one or more other documents to the large language model to generate the one or more new ideas based on the provided documents, wherein providing the summaries instead of the corresponding source documents increases an amount of information processable within the context window of the large language model;

executing, using an artificial intelligence (AI) agent, the intermediate states of the new ideas; and utilizing the large language model to iteratively validate code and figures generated by executing the intermediate states of the new ideas; including:

analyzing the generated code to identify errors and inconsistencies;

evaluating the generated figures for correctness relative to corresponding experimental results;

determining whether the results satisfy one or more predefined validation criteria; and upon determining that the predefined validation criteria are not satisfied, generating feedback for modifying the code and repeating execution of the intermediate states using the feedback; and generating, using the large language model, a technical report based on the validated results.

* * * * *